(12) United States Patent
Hikita et al.

(10) Patent No.: US 10,583,403 B2
(45) Date of Patent: Mar. 10, 2020

(54) RESIN COMPOSITION, MEMBRANE-FORMING STOCK SOLUTION, POROUS MEMBRANE, AND HOLLOW FIBER MEMBRANE, WATER TREATMENT DEVICE, ELECTROLYTE SUPPORT, AND SEPARATOR USING POROUS MEMBRANE

(71) Applicant: Mitsubishi Rayon Co., Ltd., Chiyoda-ku (JP)

(72) Inventors: Shingo Hikita, Otake (JP); Tetsuya Noda, Otake (JP); Mitsufumi Nodono, Otake (JP)

(73) Assignee: Mitsubishi Chemical Corporation, Tokyo (JP)

( * ) Notice: Subject to any disclaimer, the term of this patent is extended or adjusted under 35 U.S.C. 154(b) by 667 days.

(21) Appl. No.: 14/775,770

(22) PCT Filed: Mar. 14, 2014

(86) PCT No.: PCT/JP2014/056928
§ 371 (c)(1),
(2) Date: Oct. 28, 2015

(87) PCT Pub. No.: WO2014/142311
PCT Pub. Date: Sep. 18, 2014

(65) Prior Publication Data
US 2016/0038884 A1    Feb. 11, 2016

(30) Foreign Application Priority Data
Mar. 15, 2013 (JP) .................................. 2013-052690

(51) Int. Cl.
*B01D 63/02*    (2006.01)
*B01D 67/00*    (2006.01)
(Continued)

(52) U.S. Cl.
CPC ............. *B01D 69/08* (2013.01); *B01D 63/02* (2013.01); *B01D 67/0011* (2013.01);
(Continued)

(58) Field of Classification Search
CPC .. B01D 67/0011; B01D 69/141; B01D 69/08; B01D 1/34; B01D 1/40; B01D 1/82;
(Continued)

(56) References Cited

U.S. PATENT DOCUMENTS 4,680,352 A    7/1987 Janowicz et al.
5,076,925 A    12/1991 Roesink et al.
(Continued)

FOREIGN PATENT DOCUMENTS

JP    60-133007 A    7/1985
JP    02-302449 A    12/1990
(Continued)

OTHER PUBLICATIONS

Sigma-Aldrich, "Methyl methacrylate", Merck KGaA. Accessed Jan. 25, 2019. (Year: 2019).*
(Continued)

*Primary Examiner* — Benjamin L Lebron
(74) *Attorney, Agent, or Firm* — Morgan, Lewis & Bockius LLP

(57) ABSTRACT

The present invention pertains to a resin composition which includes component: a membrane-forming polymer, component: a polymer obtained by polymerizing a monomer composition which includes a (meth)acrylic ester macromonomer represented by general formula and another monomer, and component: a polymer including a vinylpyrrolidone unit, a membrane-forming stock solution which includes the resin composition, a porous membrane obtained by forming with the membrane-forming stock solution, and a hollow fiber membrane, a water treatment device, an
(Continued)

electrolyte support, and a separator which use the porous membrane. According to the present invention, it is possible to provide a porous membrane which has pores with high uniformity wherein the formation of large pores with a diameter of 1 μm or higher is suppressed and which has excellent fractionation performance and high water permeability, and a hollow fiber membrane, water treatment device, electrolyte support, and separator which use the porous membrane.

28 Claims, 3 Drawing Sheets

(51) Int. Cl.

| | | |
|---|---|---|
| *B01D 69/08* | (2006.01) | |
| *B01J 45/00* | (2006.01) | |
| *C08J 9/00* | (2006.01) | |
| *C08L 27/16* | (2006.01) | |
| *C08L 33/06* | (2006.01) | |
| *C08L 51/00* | (2006.01) | |
| *C08L 53/00* | (2006.01) | |
| *C08L 101/00* | (2006.01) | |
| *C09D 127/16* | (2006.01) | |
| *C09D 133/04* | (2006.01) | |
| *H01M 2/16* | (2006.01) | |
| *C08J 9/26* | (2006.01) | |
| *C08J 9/28* | (2006.01) | |
| *C08L 39/06* | (2006.01) | |
| *C08J 3/00* | (2006.01) | |
| *C08L 55/00* | (2006.01) | |

(52) U.S. Cl.
CPC ............... *B01J 45/00* (2013.01); *C08J 3/005* (2013.01); *C08J 9/0061* (2013.01); *C08J 9/26* (2013.01); *C08J 9/28* (2013.01); *C08L 27/16* (2013.01); *C08L 33/06* (2013.01); *C08L 39/06* (2013.01); *C08L 51/00* (2013.01); *C08L 101/00* (2013.01); *C09D 127/16* (2013.01); *C09D 133/04* (2013.01); *H01M 2/1653* (2013.01); *B01D 2315/06* (2013.01); *B01D 2323/12* (2013.01); *B01D 2325/38* (2013.01); *C08J 2201/046* (2013.01); *C08J 2201/0544* (2013.01); *C08J 2327/16* (2013.01); *C08J 2433/04* (2013.01); *C08J 2439/06* (2013.01); *C08J 2451/00* (2013.01); *C08L 53/00* (2013.01); *C08L 55/005* (2013.01); *C08L 2201/56* (2013.01); *C08L 2203/20* (2013.01); *C08L 2205/03* (2013.01)

(58) Field of Classification Search
CPC ............ B01D 2315/06; B01D 2323/12; B01D 2323/30; B01D 2325/38; B01D 63/02; B01J 45/00; C08J 3/005; C08J 9/0061; C08J 9/26; C08J 9/28; C08J 2201/046; C08J 2201/0544; C08J 2327/16; C08J 2433/04; C08J 2439/06; C08J 2451/00; C08L 27/16; C08L 33/06; C08L 39/06; C08L 51/00; C08L 101/00; C08L 53/00; C08L 55/005; C08L 2201/56; C08L 2203/20; C08L 2205/03; C09D 127/16; C09D 133/04; H01M 2/16; H01M 2/1653
See application file for complete search history.

(56) References Cited

U.S. PATENT DOCUMENTS

| | | | |
|---|---|---|---|
| 5,147,952 A | 9/1992 | Mori et al. | |
| 6,413,621 B1* | 7/2002 | Mayes | B01D 67/0011 |
| | | | 428/212 |
| 6,696,512 B2* | 2/2004 | Poggio | C08L 27/12 |
| | | | 428/421 |
| 2004/0072957 A1* | 4/2004 | Terano | C08F 297/083 |
| | | | 525/323 |
| 2004/0178136 A1* | 9/2004 | Taniguchi | B01D 63/02 |
| | | | 210/321.79 |
| 2005/0164025 A1* | 7/2005 | Simonetti | B01D 61/145 |
| | | | 428/532 |
| 2008/0004359 A1* | 1/2008 | Ma | C08J 3/09 |
| | | | 516/104 |
| 2011/0017661 A1* | 1/2011 | Kosar | B01D 69/02 |
| | | | 210/500.27 |
| 2011/0111188 A1* | 5/2011 | Xu | B41M 5/0256 |
| | | | 428/203 |
| 2011/0198288 A1 | 8/2011 | Mayes et al. | |

FOREIGN PATENT DOCUMENTS

| | | |
|---|---|---|
| JP | 11-240854 A | 9/1999 |
| JP | 2006-205067 A | 8/2006 |
| JP | 2006-239680 A | 9/2006 |
| JP | 2007-182571 A | 7/2007 |
| JP | 2012-143759 A | 8/2012 |
| JP | 2013-004355 A | 1/2013 |
| WO | 88/04304 A1 | 6/1988 |
| WO | 98/08595 A2 | 3/1998 |
| WO | 2009/091351 A2 | 7/2009 |
| WO | 2010/098452 A1 | 9/2010 |
| WO | 2012/093689 A1 | 7/2012 |

OTHER PUBLICATIONS

Extended European Search Report dated Mar. 18, 2016, for corresponding European Patent Application No. 14762888.7.
International Search Report dated Jun. 10, 2014, for International Application No. PCT/JP2014/056928.
Office Action issued in corresponding Japanese Patent Application No. 2014-514975 dated Jan. 27, 2015.
Office Action dated May 16, 2018, issued in corresponding Indian Patent Application No. 6248/CHENP/2015.

\* cited by examiner

[Fig. 1]
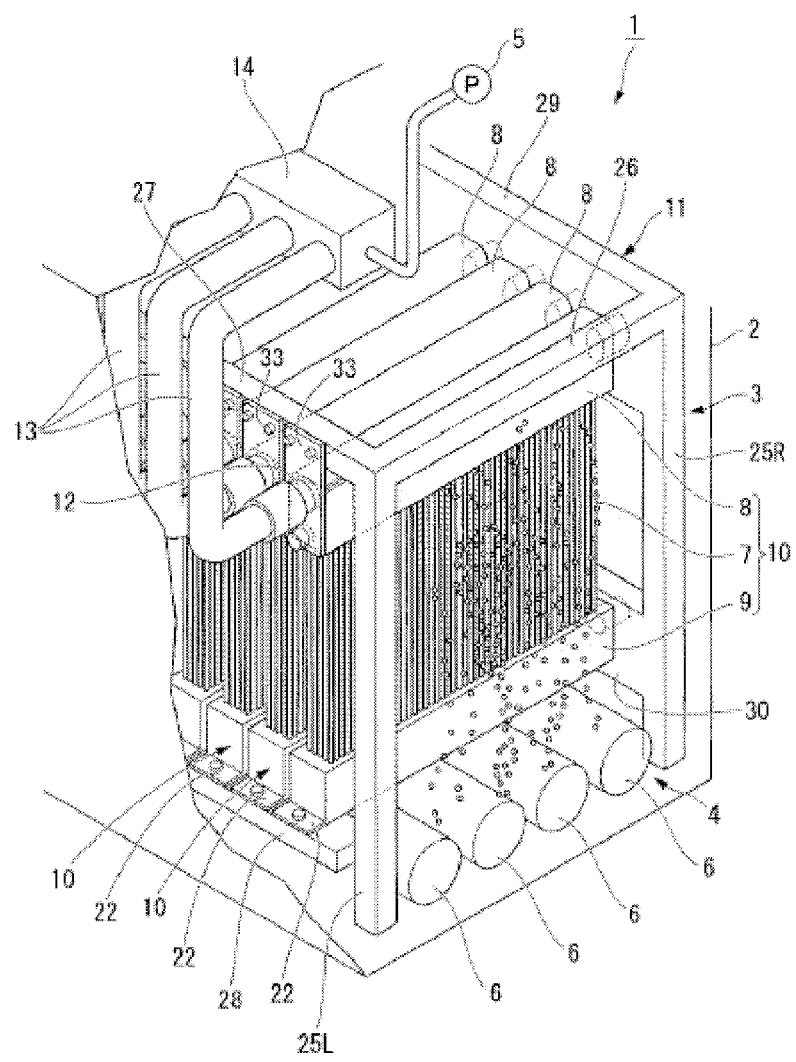

[Fig. 2A]
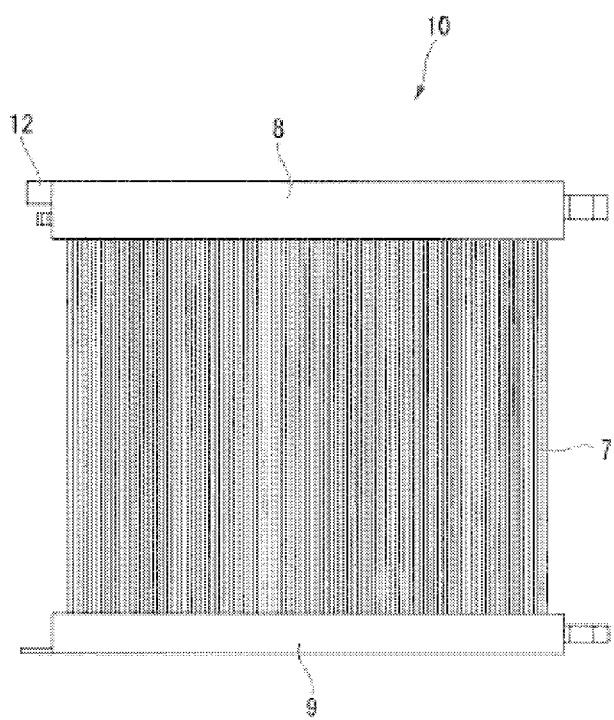

[Fig. 2B]
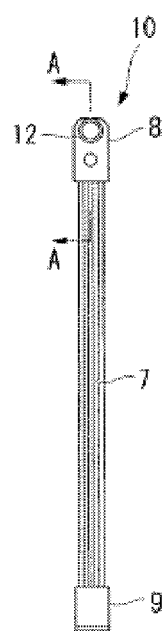

RESIN COMPOSITION, MEMBRANE-FORMING STOCK SOLUTION, POROUS MEMBRANE, AND HOLLOW FIBER MEMBRANE, WATER TREATMENT DEVICE, ELECTROLYTE SUPPORT, AND SEPARATOR USING POROUS MEMBRANE

TECHNICAL FIELD

The present invention relates to a resin composition, a membrane-forming stock solution, a porous membrane, and a hollow fiber membrane, a water treatment device, an electrolyte support, and a separator which use the porous membrane.

The invention is based upon and claims the benefit of priority of the prior Japanese Patent Application No. 2013-052690 filed on Mar. 15, 2013, the entire contents of which are incorporated herein by reference.

BACKGROUND ART

Porous membranes are used in various fields such as the water treatment field including drinking water production, water purification treatment, and wastewater treatment. In recent years, simplification of the manufacturing process has been desired in addition to the performance of membrane such as high fractionation performance or hydrophilicity.

As the production method for obtaining a porous membrane, for example, as in Patent Document 1, a production method including a step of containing a hydrophilic macromolecule such as polyvinylpyrrolidone (PVP) as a pore forming agent in a polymer which forms a membrane substrate, producing a membrane, and then removing the hydrophilic macromolecule is mentioned.

In addition, a separation membrane containing a hydrophilic macromolecule, such as a graft copolymer or random copolymer of vinylpyrrolidone and a (meth)acrylate, that is treated to be insoluble in water so that the hydrophilic component does not elute into water for the purpose of hydrophilizing the porous membrane is disclosed in Patent Document 2 and Patent Document 3.

CITATION LIST

Patent Document

Patent Document 1: JP 2-302449 A
Patent Document 2: JP 2006-239680 A
Patent Document 3: JP 2006-205067 A

DISCLOSURE OF THE INVENTION

Problem to be Solved by the Invention

However, the porous membrane obtained in Patent Document 1 is hydrophobic, and thus the production method further includes a step of cross-linking polyvinylpyrrolidone to immobilize it in the membrane in a state that polyvinylpyrrolidone is not entirely removed from the porous membrane but a small amount of polyvinylpyrrolidone is left in the membrane for the purpose of hydrophilizing the porous membrane, and as a result, the production method is complicated.

In addition, when producing a separation membrane containing a hydrophilic macromolecule of Patent Document 2 and Patent Document 3, white turbidity occurs at the time of preparing a solution for membrane production, the uniformity of the separation membrane thus obtained decreases, and thus variation in quality occurs for each lot in some cases.

An object of an aspect of the invention is to provide a resin composition suitable for obtaining a porous membrane which exhibits favorable fractionation performance and high water permeability. In addition, an object of an aspect of the invention is to provide a membrane-forming stock solution which contains the resin composition and exhibits excellent transparency as well.

In addition, an object of an aspect of the invention is to provide a porous membrane in which the formation of a large pore having a diameter of 1 μm or more is suppressed and which has high uniform pores and exhibits favorable fractionation performance and high water permeability. In addition, an object of an aspect of the invention is to provide a hollow fiber membrane, a water treatment device, an electrolyte support, and a separator which use the porous membrane.

Means for Solving Problem

The above problem is solved by the following inventions [1] to [11].

[1] A solution including the following (A), (B), and (C);
(A): a membrane-forming polymer,
(B): a polymer obtained by polymerizing a monomer composition containing a (meth)acrylic acid ester macromonomer (b1) represented by the following Formula (1) and another monomer (b2), and
(C): a polymer containing a vinylpyrrolidone unit.

[Chem. 1]

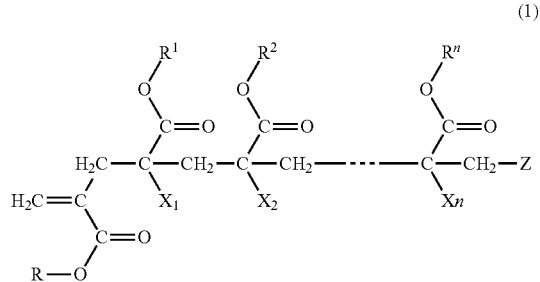

(1)

In Formula (1) above, R and $R^1$ to $R^n$ each independently represent a hydrogen atom, an alkyl group, a cycloalkyl group, an aryl group, or a heterocyclic group.

$X_1$ to $X_n$ each independently represent a hydrogen atom or a methyl group.

Z represents a terminal group.

n represents a natural number of from 3 to 10,000.

[2] The solution according to [1], in which a transmittance at 400 nm is 70% or more.

[3] The solution according to [1] or [2], in which the membrane-forming polymer (A) is at least one kind selected from a fluorine-containing polymer, polyvinyl chloride, polyethylene, polypropylene, polystyrene, a polystyrene derivative, a polysulfone, polyether sulfone, and cellulose acetate.

[4] The solution according to [1] or [2], in which the membrane-forming polymer (A) is at least one kind selected from a fluorine-containing polymer, polyethylene, and polyether sulfone.

[5] The solution according to [1] or [2], in which the membrane-forming polymer (A) is a fluorine-containing polymer.

[6] The solution according to any one of [2] to [5], in which the fluorine-containing polymer is at least one kind selected from polyvinylidene fluoride, polyvinylidene fluoride-co-hexafluoropropylene, ethylene-co-chlorotrifluoroethylene, polyvinyl fluoride, and polytetrafluoroethylene.

[7] The solution according to any one of [1] to [6], in which a ratio of a macromonomer (b1) unit to a sum of the macromonomer (b1) unit and another monomer (b2) unit in the polymer (B) is from 5 to 99% by mass.

[8] The solution according to any one of [1] to [7], in which another monomer (b2) is a (meth)acrylic acid ester containing at least one of (meth)acrylic acid, a (meth)acrylic acid ester having a polyethylene glycol unit in a side chain, and a (meth)acrylic acid ester having a hydroxyl group.

[9] A porous membrane obtained by removing the polymer (C) containing a vinylpyrrolidone unit from the solution according to any one of [1] to [8].

[10] An electrolyte support including the porous membrane according to [9].

[11] A separator including the porous membrane according to [10].

In addition, the invention has the following facets.

<1> A resin composition including the following component (A), component (B), and component (C);
component (A): a membrane-forming polymer,
component (B): a polymer obtained by polymerizing a monomer composition containing a (meth)acrylic acid ester macromonomer (b1) represented by the following Formula (1) and another monomer (b2), and
component (C): a polymer containing a vinylpyrrolidone unit.

[Chem. 2]

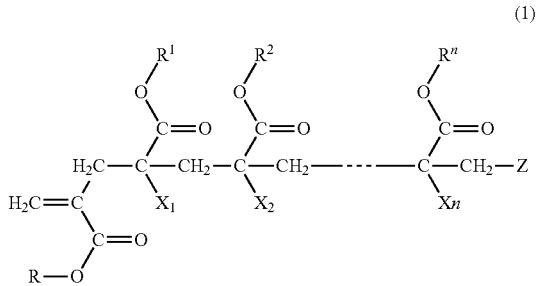

(1)

(in Formula (1) above, R and $R^1$ to $R^n$ each independently represent a hydrogen atom, an alkyl group, a cycloalkyl group, an aryl group, or a heterocyclic group, $X_1$ to $X_n$ each independently represent a hydrogen atom or a methyl group, Z represents a terminal group, and n represents a natural number of from 3 to 10,000.)

<2> The resin composition according to <1>, in which the component (A) is a polymer containing a fluorine atom or a chlorine atom in the molecule.

<3> The resin composition according to <2>, in which the polymer containing a fluorine atom in the molecule is at least one polymer selected from the group consisting of polyvinylidene fluoride, a polyvinylidene fluoride-hexafluoropropylene copolymer, an ethylene-chlorotrifluoroethylene copolymer, and polytetrafluoroethylene.

<4> The resin composition according to <2>, in which the polymer containing a chlorine atom in the molecule is at least one polymer selected from the group consisting of polyvinyl chloride and chlorinated polyvinyl chloride.

<5> The resin composition according to <1>, in which the component (A) is a polyolefin, a polysulfone, polyether sulfone, cellulose, or any derivative thereof <6> The resin composition according to any one of <1> to <5>, in which a proportion of a monomer unit of the macromonomer (b1) with respect to a total mass of a monomer unit of the macromonomer (b1) and a monomer unit of another monomer (b2) in the component (B) is from 5 to 99% by mass.

<7> The resin composition according to any one of <1> to <6>, in which another monomer (b2) is at least one (meth)acrylic acid ester selected from the group consisting of (meth)acrylic acid, a (meth)acrylic acid ester having a polyethylene glycol unit in a side chain, and a (meth)acrylic acid ester having a hydroxyl group.

<8> The resin composition according to any one of <1> to <7>, in which a content of the component (C) with respect to 100 parts by mass of a total amount of the component (A), the component (B), and the component (C) is from 0.1 to 50 parts by mass.

<9> A membrane-forming stock solution including the resin composition according to any one of <1> to <8> and a solvent capable of dissolving the component (A).

<10> The membrane-forming stock solution according to <9>, in which a transmittance of visible light at a wavelength of 400 nm is 70% or more.

<11> A porous membrane obtained by a production method including a step of obtaining a porous membrane precursor using the membrane-forming stock solution according to <9> or <10> and a step of removing a part or the whole of the component (C) from the precursor.

<12> A hollow fiber membrane including the porous membrane according to <11>.

<13> An electrolyte support including the porous membrane according to <11> and an electrolyte.

<14> A separator including the porous membrane according to <11>.

<15> A water treatment device including the porous membrane according to <11>.

Effect of the Invention

In the invention, it is possible to obtain a porous membrane in which the formation of a large pore having a diameter of 1 μm or more is suppressed and which has high uniform pores and exhibits favorable fractionation performance and high water permeability as a membrane-forming stock solution which contains a resin composition containing a specific component and exhibits favorable transparency is used. Hence, it is possible to provide a porous membrane that can be utilized in a hollow fiber membrane or the like having a suitable average pore size (about from 1 to $1 \times 10^{-1}$ μm) in the water treatment field, or an electrolyte support such as a support swollen with a lithium ion electrolytic solution and a separator of a lithium ion battery or the like using the porous membrane.

BRIEF DESCRIPTION OF DRAWINGS

FIG. 1 is a perspective view of a water treatment device that is an embodiment of a porous membrane of the invention;

FIG. 2A is a front view of a flat-type hollow fiber membrane element included in the water treatment device of FIG. 1; and FIG. 2B is a left side view of a flat-type hollow fiber membrane element included in the water treatment device of FIG. 1.

MODE(S) FOR CARRYING OUT THE INVENTION

[Resin Composition]

In an aspect of the invention, the resin composition is one that contains the following component (A), component (B), and component (C);

component (A): a membrane-forming polymer, component (B): a polymer obtained by polymerizing a monomer composition containing a (meth)acrylic acid ester macromonomer (b1) represented by the following Formula (1) and another monomer (b2), and component (C): a polymer containing a vinylpyrrolidone unit.

[Chem. 3]

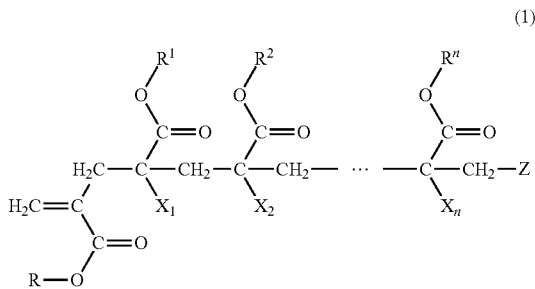

(1)

(in Formula (1) above, R and $R^1$ to $R^n$ each independently represent a hydrogen atom, an alkyl group, a cycloalkyl group, an aryl group, or a heterocyclic group, $X_1$ to $X_n$ each independently represent a hydrogen atom or a methyl group, Z represents a terminal group, and n represents a natural number of from 3 to 10,000.)

In addition, in Formula (1) above, (meth)acrylic acid units having substituents of $R^3$, $R^4$, $R^5$, . . . , $R^{n-1}$ are lined up between $R^2$ and $R^n$. The same applies to between $X_2$ and $X_n$ as well.

Hereinafter, the respective components will be explained in order.

<Component (A): Membrane-Forming Polymer>

The component (A) is a membrane-forming polymer, and the membrane-forming polymer (hereinafter, referred to as the "membrane-forming polymer (A)" in some cases) is one of the components constituting the membrane-forming stock solution and the porous membrane of the invention.

The membrane-forming polymer (A) is one that is used for maintaining the structure of the porous membrane of the invention, namely, a component used for forming the membrane structure of the porous membrane, and the composition thereof can be selected according to the characteristics required to the porous membrane.

In an embodiment of the invention, in a case in which chemical resistance, oxidation deterioration resistance, and heat resistance are required as a porous membrane, examples of the membrane-forming polymer (A) may include a fluorine-containing polymer such as polyvinylidene fluoride (PVDF), PVDF-co-hexafluoropropylene (HFP), ethylene-co-chlorotrifluoroethylene (ECTFE), polyvinyl fluoride, or polytetrafluoroethylene (PTFE), polyvinyl chloride (PVC), polyethylene, polypropylene, polystyrene, any polystyrene derivative, a polyamide, a polyurethane, a polycarbonate, a polysulfone, polyether sulfone, and cellulose acetate.

In an aspect of the invention, the membrane-forming polymer (A) is preferably at least one polymer selected from the group consisting of a fluorine-containing polymer such as polyvinylidene fluoride (PVDF), PVDF-co-hexafluoropropylene (HFP), ethylene-co-chlorotrifluoroethylene (ECTFE), polyvinyl fluoride, or polytetrafluoroethylene (PTFE), polyethylene, and polyether sulfone from the viewpoint of excellent chemical resistance and oxidation deterioration resistance of the porous membrane.

In addition, in an aspect of the invention, as the membrane-forming polymer (A), a polymer containing a fluorine atom or a chlorine atom in the molecule is preferable.

In an aspect of the invention, as the polymer containing a fluorine atom in the molecule of the membrane-forming polymer (A), at least one polymer selected from the group consisting of polyvinylidene fluoride (PVDF), a polyvinylidene fluoride-hexafluoropropylene copolymer, an ethylene-chlorotrifluoroethylene copolymer, and polytetrafluoroethylene is preferable, and PVDF is even more preferable from the viewpoint of oxidation deterioration resistance and mechanical durability of the porous membrane. As these polymers containing a fluorine atom in the molecule, for example, it is preferable to use those which have a mass average molecular weight of from 10,000 to 2,000,000.

In addition, in an aspect of the invention, as the polymer containing a chlorine atom in the molecule of the membrane-forming polymer (A), at least one polymer selected from the group consisting of polyvinyl chloride (PVC) and chlorinated polyvinyl chloride is preferable.

As these polymers containing a chlorine atom in the molecule, for example, it is preferable to use those which have a mass average molecular weight of from 10,000 to 2,000,000.

In addition, in an aspect of the invention, the membrane-forming polymer (A) is preferably a polyolefin, a polysulfone, polyether sulfone, cellulose, or any derivative thereof. As these polymers, for example, it is preferable to use those which have a mass average molecular weight of from 10,000 to 2,000,000.

In addition, in the present specification, the "chlorinated polyvinyl chloride" refers to a polymer obtained by chlorinating polyvinyl chloride.

The membrane-forming polymer (A) may be used singly or in combination of two or more kinds thereof.

In addition, in an aspect of the invention, the membrane-forming polymer (A) is preferably a polymer that is soluble in the solvent (III) to be described later and insoluble in pure water.

Here, the term "soluble" means a state that 0.1 part by mass or more of a polymer is dissolved in 100 parts by mass of a solvent.

Among the polymers described above, PVDF is preferable from the viewpoint of compatibility with the polymer of the component (B) to be described later (hereinafter, referred to as the "polymer (B)" in some cases), the component (C) of a polymer containing a vinylpyrrolidone unit (hereinafter, referred to as the "polymer (C), or the polymer (C) containing a vinylpyrrolidone unit" in some cases), and the solvent (III), chemical resistance, and heat resistance.

In an aspect of the invention, as the membrane-forming polymer (A), a polymer having a mass average molecular weight (hereinafter, referred to as "Mw") of from 100,000 to 2,000,000 is preferable. The mechanical strength of the porous membrane of the invention tends to be favorable in a case in which Mw is 100,000 or more, and the compatibility with the polymer (C) containing a vinylpyrrolidone unit and the solvent (III) tends to be favorable in a case in which Mw is 2,000,000 or less. The lower limit value of Mw is more preferably 300,000, and the upper limit value of Mw is more preferably 1,500,000. In other words, in an aspect of the invention, the mass average molecular weight of the membrane-forming polymer (A) is preferably from 100,000 to 2,000,000, more preferably 300,000 to 2,000,000, and even more preferably 300,000 to 1,500,000.

The mass average molecular weight refers to the value determined using the calibration curve created using polystyrene standards manufactured by TOSOH CORPORATION (nine kinds of Mp (peak top molecular weight) of 76,969,900, 2,110,000, 1,260,000, 775,000, 355,000, 186,000, 19,500, 1,050 and styrene monomer (M=104) manufactured by NS styrene monomer Co., Ltd.) by gel permeation chromatography.

Incidentally, in the case of using those having the above Mw as the membrane-forming polymer (A), it is possible to prepare the membrane-forming polymer (A) having an intended Mw by mixing those having different Mw.

In other words, in an aspect of the invention, the above-described Mw of the membrane-forming polymer (A) may be Mw of one kind of polymer, or it may be an average value of Mw of the respective polymers in the case of concurrently using two or more kinds of polymers. As the calculation method thereof in a case in which Mw is the average value of two or more kinds of polymers, for example, a method in which the parts by mass of each polymer with respect to 100 parts by mass of the sum of all the polymers which are concurrently used is multiplied in percentage and the plurality of Mw thus obtained are summed.

<Component (B): Polymer Obtained by Polymerizing Monomer Composition Containing (Meth)Acrylic Acid Ester Macromonomer (b1) Represented by Formula (1) Above and Another Monomer (b2)>

In an aspect of the invention, the component (B) contained in the resin composition is a polymer which is obtained by polymerizing a monomer composition containing a (meth)acrylic acid ester macromonomer (b1) represented by Formula (1) above (hereinafter, referred to as the "macromonomer (b1)" in some cases) and another monomer (b2).

(Monomer Composition)

In an aspect of the invention, the monomer composition contains the macromonomer (b1) and another monomer (b2).

The content of the macromonomer (b1) with respect to the total mass is preferably from 5 to 99 parts by mass when the total mass of the macromonomer (b1) and another monomer (b2) in the monomer composition is set to 100 parts by mass. The transparency of the membrane-forming stock solution of the invention tends to be favorable when the content of the macromonomer (b1) is 5 parts by mass or more. In addition, the contact angle of pure water on the porous membrane of the invention tends to be favorable, namely, from 1 to 75° when the content of the macromonomer (b1) is 99 parts by mass or less.

Here, the "contact angle of pure water on the porous membrane" can be determined by taking a photograph of the state of the water drop in 3 seconds after dropping a water drop of pure water on the surface of the porous membrane using the CCD camera in a contact angle measuring apparatus and measuring the contact angle of the water drop in the photograph thus obtained using the image processing program incorporated in the contact angle measuring apparatus.

The lower limit value of the content of the macromonomer (b1) is more preferably 20 parts by mass, even more preferably 40 parts by mass, and even more preferably 50 parts by mass. The upper limit value of the content of the macromonomer (b1) is more preferably 98 parts by mass and even more preferably 95 parts by mass.

In other words, in an aspect of the invention, the content of the macromonomer (b1) in the monomer composition is preferably from 5 to 99 parts by mass, more preferably from 20 to 98 parts by mass, even more preferably from 40 to 98 parts by mass, even more preferably from 40 to 95 parts by mass, and even more preferably from 50 to 95 parts by mass with respect to the total mass when the total mass of the macromonomer (b1) and another monomer (b2) in the monomer composition is set to 100 parts by mass.

((Meth)Acrylic Acid Ester Macromonomer (b1))

The (meth)acrylic acid ester macromonomer (b1) is one of the raw materials for constituting the polymer (B) contained in the membrane-forming stock solution and the porous membrane of the invention.

The macromonomer (b1) is one which has a radical-polymerizable unsaturated double bond at one terminal of the poly(meth)acrylic acid ester segment and is a monomer represented by Formula (1) above. Here, the macromonomer is a high molecular weight monomer having a polymerizable functional group and is one that is also called alias macromer. Incidentally, in the invention, the "(meth)acrylic acid" indicates "acrylic acid" or "methacrylic acid".

In other words, in an aspect of the invention, the macromonomer (b1) refers to a poly(meth)acrylic acid ester which is represented by Formula (1) and has an unsaturated double bond that is radical-polymerizable with another monomer (b2) at one terminal.

Here, the "terminals of the macromonomer" means the end portions of the main chain when the longest part of the molecular chain is regarded as the main chain of the monomer.

The macromonomer (b1) is those represented by Formula (1) above.

In Formula (1), R and $R^1$ to $R''$ each independently represent a hydrogen atom, an alkyl group, a cycloalkyl group, an aryl group, or a heterocyclic group. The alkyl group, the cycloalkyl group, the aryl group, or the heterocyclic group may further have a substituent.

Here, the fact that R and $R^1$ to $R''$ have a substituent means that at least one of the hydrogen atoms in the alkyl group, the cycloalkyl group, the aryl group, or the heterocyclic group is substituted with the group to be described later.

Examples of the alkyl group of R or $R^1$ to $R''$ may include a straight chain alkyl group having from 1 to 20 carbon atoms. Specific examples of the alkyl group of R or $R^1$ to $R''$ may include a methyl group, an ethyl group, a n-propyl group, and an i-propyl group. In an aspect of the invention, in a case in which a branched chain is contained in the alkyl group of R and $R^1$ to $R''$, the branched part is defined as a substituent.

Examples of the cycloalkyl group of R or $R^1$ to $R''$ may include a cycloalkyl group having from 3 to 20 carbon atoms. Specific examples of the cycloalkyl group of R or $R^1$ to $R''$ may include a cyclopropyl group, a cyclobutyl group, and an adamantyl group.

Examples of the aryl group of R or $R^1$ to $R''$ may include an aryl group having from 6 to 18 carbon atoms. Specific examples of the aryl group of R or $R^1$ to $R''$ may include a phenyl group and a naphthyl group.

Examples of the heterocyclic group of R or $R^1$ to $R''$ may include a heterocyclic group having from 5 to 18 carbon atoms and a nitrogen atom, an oxygen atom, or a sulfur atom. Specific examples of the heterocyclic group of R or $R^1$ to $R''$ may include a γ-lactone group and an ε-caprolactone group.

In an aspect of the invention, in a case in which the preferred groups of R or $R^1$ to $R''$ which have been described above further have a substituent, examples of the substituents may each independently include a group or atom selected from the group consisting of an alkyl group, an aryl group, a carboxyl group, an alkoxycarbonyl group (—COOR'), a cyano group, a hydroxyl group, an amino group, an amide group (—CONR'R''), a halogen, an allyl group, an epoxy group, an alkoxy group (—OR'), and a hydrophilic or ionic group. Incidentally, examples of R' or R'' may each independently include the same groups as R excluding the heterocyclic group.

Examples of the alkoxycarbonyl group of the substituent of R or $R^1$ to $R''$ may include a methoxycarbonyl group.

Examples of the amide group of the substituent of R or $R^1$ to $R''$ may include a dimethylamide group.

Examples of the halogen of the substituent of R or $R^1$ to $R''$ may include fluorine, chlorine, bromine, and iodine.

Examples of the alkoxy group of the substituent of R or $R^1$ to $R''$ may include an alkoxy group having 1 to 12 carbon atoms, and specific examples thereof may include a methoxy group.

Examples of the hydrophilic or ionic group of the substituent of R or $R^1$ to $R''$ may include an alkali salt of a carboxyl group (—COOH), or an alkali salt of a sulfoxyl group (—$SO_3H$), a poly(alkylene oxide) group such as a polyethylene oxide group or a polypropylene oxide group, and a cationic substituent such as a quaternary ammonium base.

In an aspect of the invention, R and $R^1$ to $R''$ is preferably at least one selected from the group consisting of an alkyl group and a cycloalkyl group, and an alkyl group is more preferable.

In addition, in an aspect of the invention, as the alkyl group of R and $R^1$ to $R''$, a methyl group, an ethyl group, a n-propyl group, or an i-propyl group is preferable, and a methyl group is more preferable from the viewpoint of ease of availability.

In Formula (1) above, $X_1$ to $X_n$ are each independently a hydrogen atom or a methyl group, and a methyl group is preferable.

In Formula (1) above, as $X_1$ to $X_n$, it is preferable that a half or more of $X_1$ to $X_n$ are a methyl group from the viewpoint of ease of synthesis. Here, examples of the method to confirm that a half or more of $X_1$ to $X_n$ are a methyl group may include a method to analyze the substance by known nuclear magnetic resonance (NMR) spectrum.

In Formula (1) above, Z is a terminal group of the macromonomer (b1). Here, the terminal group of the macromonomer (b1) means a group on the side opposite to the side on which a group having an unsaturated double bond is added of the macromonomer (b1). Examples of the terminal group of the macromonomer (b1) may include a group derived from a hydrogen atom and a radical polymerization initiator in the same manner as the terminal group of the polymer obtained by known radical polymerization.

In Formula (1) above, n is a natural number of from 3 to 10,000. In addition, n is more preferably from 10 to 10,000.

Examples of the (meth)acrylic acid ester constituting the poly(meth)acrylic acid ester segment (backbone) in the macromonomer (b1) may include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, isoamyl (meth)acrylate, hexyl (meth)acrylate, octyl (meth)acrylate, lauryl (meth)acrylate, dodecyl (meth)acrylate, stearyl (meth)acrylate, phenyl (meth)acrylate, benzyl (meth)acrylate, glycidyl (meth)acrylate, 2-ethylhexyl (meth)acrylate, 2-hydroxyethyl (meth)acrylate, 2-hydroxypropyl (meth)acrylate, 2-hydroxybutyl (meth)acrylate, 3-hydroxybutyl (meth)acrylate, 4-hydroxybutyl (meth)acrylate, polyethylene glycol (meth)acrylate, polypropylene glycol (meth)acrylate, methoxyethyl (meth)acrylate, ethoxyethyl (meth)acrylate, n-butoxyethyl (meth)acrylate, iso-butoxyethyl (meth)acrylate, t-butoxyethyl (meth)acrylate, phenoxyethyl (meth)acrylate, nonylphenoxyethyl (meth)acrylate, and 3-methoxybutyl (meth)acrylate. In addition, examples of the commercially available product may include PLACCEL FM (tradename, manufactured by DAICEL CORPORATION, unsaturated fatty acid hydroxyalkyl ester-modified ε-caprolactone), BLEMMER PME-100 (trade name, manufactured by NOF CORPORATION, methoxypolyethylene glycol methacrylate (chain of ethylene glycol is 2)), BLENMER PME-200 (trade name, manufactured by NOF CORPORATION, methoxypolyethylene glycol methacrylate (chain of ethylene glycol is 4)), BLEMMER PME-400 (trade name, manufactured by NOF CORPORATION, methoxypolyethylene glycol methacrylate (chain of ethylene glycol is 9)), BLENMER 50POEP-800B (trade name, manufactured by NOF CORPORATION, octoxypolyethylene glycol-polypropylene glycol-methacrylate (chain of ethylene glycol is 8, chain of propylene glycol is 6)), BLEMMER 20ANEP-600 (trade name, manufactured by NOF CORPORATION, nonylphenoxy(ethylene glycol-polypropylene glycol)monoacrylate), BLENMER AME-100 (trade name, manufactured by NOF CORPORATION), BLENMER AME-200 (trade name, manufactured by NOF CORPORATION), and BLENMER 50AOEP-800B (trade name, manufactured by NOF CORPORATION).

Among these, a methacrylic acid ester is preferable from the viewpoint of easy availability of the monomer and the mechanical properties of the polymer (B), methyl methacrylate, n-butyl methacrylate, lauryl methacrylate, dodecyl methacrylate, stearyl methacrylate, 2-ethylhexyl methacrylate, glycidyl methacrylate, 2-hydroxyethyl methacrylate, 4-hydroxybutyl methacrylate, BLEMMER PME-100, BLEMMER PME-200, and BLEMMER PME-400 are more preferable, and methyl methacrylate, n-butyl methacrylate, 2-ethylhexyl methacrylate, 2-hydroxyethyl methacrylate, 4-hydroxybutyl methacrylate, BLEMMER PME-100, BLEMMER PME-200, and BLEMMER PME-400 are even more preferable. Among these, methyl methacrylate is even more preferable from the viewpoint of favorable compatibility with PVDF in a case in which the membrane-forming polymer (A) is PVDF.

The methacrylic acid esters described above may be used singly or in combination of two or more kinds of thereof In an aspect of the invention, the number average molecular weight (hereinafter, referred to as "Mn") of the macromonomer (b1) is preferably from 1,000 or more and 1,000,000 or less from the balance of mechanical properties of the polymer (B) to be obtained. The lower limit value of Mn is more preferably 3,000 or more and even more preferably 4,000 or more. The upper limit value of Mn is more preferably 60,000 or less and even more preferably 50,000 or less. Mn refers to the value determined using the calibration curve created using polymethyl methacrylate (four kinds of Mp (peak top molecular weight) of 141,500, 55,600, 10,290, and 1,590) manufactured by Polymer Laboratories, Varian, Inc. by gel permeation chromatography.

In an aspect of the invention, the molecular weight distribution (hereinafter, referred to as "Mw/Mn") of the macromonomer (b1) is preferably 1.5 or more and 5.0 or less from the balance of the mechanical properties of the polymer (B) to be obtained.

In an aspect of the invention, the macromonomer (b1) may be used singly or in combination of two or more kinds thereof Examples of the method for producing such a macromonomer (b1) may include a method to produce the macromonomer (b1) using a cobalt chain transfer agent (for example, U.S. Pat. No. 4,680,352), a method to use an α-substituted unsaturated compound such as α-bromomethylstyrene as a chain transfer agent (for example, WO 88/04, 304 A), a method to chemically bond a polymerizable group (for example, JP 60-133007 A and U.S. Pat. No. 5,147,952), and a method to use thermal decomposition (for example, JP 11-240854 A). Among these, a method to produce the macromonomer (b1) using a cobalt chain transfer agent is preferable from the viewpoint of being able to efficiently produce the macromonomer (b1).

Examples of the production method of the macromonomer (b1) may include a bulk polymerization method, a solution polymerization method, a suspension polymerization method, and a water-based dispersion polymerization method such as emulsion polymerization method. Among these, a solution polymerization method, a suspension polymerization method, and a water-based dispersion polymerization method such as an emulsion polymerization method are preferable from the viewpoint of simplification of the recovery step of the macromonomer (b1).

In an aspect of the invention, examples of the solvent (I) used when obtaining the macromonomer (b1) by a solution polymerization method may include a hydrocarbon such as toluene; an ether such as diethyl ether or tetrahydrofuran; a halogenated hydrocarbon such as dichloromethane or chloroform; a ketone such as acetone; an alcohol such as methanol; a nitrile such as acetonitrile; a vinyl ester such as ethyl acetate; a carbonate such as ethylene carbonate; and supercritical carbon dioxide. These may be used singly or in combination of two or more kinds thereof.

In other words, in an aspect of the invention, in the case of polymerizing the macromonomer (b1) by a solution polymerization method, the method is preferably a method including a step of reacting the solvent (I), the (meth)acrylic acid ester, the polymerization initiator, and the chain transfer agent which are described above at a reaction temperature of from 25 to 200° C. for from 0.5 to 24 hours.

(Another Monomer (b2))

In an aspect of the invention, another monomer (b2) is one of the raw materials for constituting the polymer (B) contained in the membrane-forming stock solution and the porous membrane of the invention.

In an aspect of the invention, examples of another monomer (b2) may include the same monomers as the (meth)acrylic acid ester constituting the poly(meth)acrylic ester segment in the macromonomer (b1).

In the invention, another monomer (b2) may be used singly or in combination of two or more kinds thereof.

<Polymer (B)>

In an aspect of the invention, the polymer (B) is one of the constituents of the porous membrane and the membrane-forming stock solution of the invention.

In an aspect of the invention, the polymer (B) is a polymer obtained by polymerizing a monomer composition containing the macromonomer (b1) and another monomer (b2), and it is preferable that the polymer (B) is constituted by at least one selected from the group consisting of a block copolymer of the macromonomer (b1) and another monomer (b2) and a graft copolymer of another monomer (b2) having the macromonomer (b1) unit in the side chain.

In an aspect of the invention, the polymer (B) may contain at least one selected from the group consisting of a polymer having only the macromonomer (b1) unit, a polymer having only the unit of another monomer (b2), the unreacted macromonomer (b1), and the unreacted another monomer (b2).

Mn of the polymer (B) is preferably 1,000 or more and 5,000,000 or less from the viewpoint of the tensile strength, tensile elongation, flexural strength, and thermal stability of the polymer (B). The lower limit value of Mn of the polymer (B) is more preferably 2,000 and even more preferably 5,000. The upper limit value of Mn of the polymer (B) is more preferably 300,000. Here, Mn of the polymer (B) refers to the value determined using the calibration curve created using polymethyl methacrylate (four kinds of Mp (peak top molecular weight) of 141,500, 55,600, 10,290, and 1,590) manufactured by Polymer Laboratories, Varian, Inc. by gel permeation chromatography.

In an aspect of the invention, as the polymer (B), the polymers described above may be used singly or two or more kinds of the polymers which have different composition ratios, chain distributions, or molecular weights and are described above can be used in combination.

In an aspect of the invention, examples of the method for producing the polymer (B) may include a bulk polymerization method, a solution polymerization method, a suspension polymerization method, and an emulsion polymerization method. Among these, a solution polymerization method is preferable from the viewpoint of the polymerization reactivity of the macromonomer (b1) and another monomer (b2).

Examples of the solvent (II) that is used in the case of producing the polymer (B) by a solution polymerization method may include the same solvents as the solvent (1) used when obtaining the macromonomer (b1) by a solution polymerization method, or tetrahydrofuran (THF), dimethylformamide (DMF), dimethylacetamide (DMAc), dimethyl sulfoxide (DMSO), N-methylpyrrolidone (NMP), hexamethylphosphoric triamide (HMPA), tetramethyl urea (TMU), triethyl phosphate (TEP), and trimethyl phosphate (TMP). Among these, THF, DMF, DMAc, DMSO, and NMP are preferable from the viewpoint of solubility of the membrane-forming polymer (A), the polymer (B), and the polymer (C) containing a vinylpyrrolidone unit and ease of handling. The solvent (II) may be used singly or in combination of two or more kinds thereof It is possible to use a chain transfer agent such as a mercaptan, hydrogen, α-methylstyrene dimer, or a terpenoid when producing the polymer (B) in order to adjust the molecular weight of the polymer (B).

It is possible to use a radical polymerization initiator when obtaining the polymer (B).

Examples of the radical polymerization initiator may include an organic peroxide and an azo compound.

Specific examples of the organic peroxide may include 2,4-dichlorobenzoyl peroxide, t-butyl peroxypivalate, o-methylbenzoyl peroxide, bis-3,5,5-trimethylhexanoyl peroxide, octanoyl peroxide, t-butylperoxy-2-ethylhexanoate, cyclohexanone peroxide, benzoyl peroxide, methyl ethyl ketone peroxide, dicumyl peroxide, lauroyl peroxide, diisopropylbenzene hydroperoxide, t-butyl hydroperoxide, and di-t-butyl peroxide.

Specific examples of the azo compound may include 2,2'-azobisisobutyronitrile (AIBN), 2,2'-azobis(2,4-dimethylvaleronitrile), and 2,2'-azobis(2,4-dimethyl-4-methoxyvaleronitrile).

As the radical polymerization initiator, benzoyl peroxide, AIBN, 2,2'-azobis(2,4-dimethylvaleronitrile), and 2,2'-azobis(2,4-dimethyl-4-methoxyvaleronitrile) are preferable from the viewpoint of ease of availability and of having a half-life temperature suitable for the polymerization condition. These may be used singly or in combination of two or more kinds thereof The amount of the radical polymerization initiator added is preferably 0.0001 part by mass or more and 10 parts by mass or less with respect to 100 parts by mass of another monomer (b2).

The polymerization temperature for obtaining the polymer (B) is, for example, preferably from −100 to 250° C. from the viewpoint of a suitable boiling point of the solvent to be used or a suitable range of the temperature at which the radical polymerization initiator is used. The lower limit value of the polymerization temperature is more preferably 0° C., and the upper limit value is more preferably 200° C.

In addition, the reaction time is more preferably from 0.5 to 24 hours.

<Polymer (C) Containing Vinylpyrrolidone Unit>

The polymer (C) containing a vinylpyrrolidone unit is one of the constituents of the resin composition and the membrane-forming stock solution of the invention.

The polymer (C) containing a vinylpyrrolidone unit is added in order to control the phase separation between the membrane-forming polymer (A) and the solvent (III).

In the present specification, a polymer containing a vinylpyrrolidone unit refers to a polymer having a monomer unit of vinylpyrrolidone in the molecule.

Examples of the polymer (C) containing a vinyl pyrrolidone unit may include a polymer containing polyvinylpyrrolidone or a vinylpyrrolidone unit and another monomer (c-1) unit.

Examples of another monomer (c-1) may include the same monomers as the (meth)acrylic acid ester contained in the poly(meth)acrylic acid ester segment in the macromonomer (b1). These may be used singly or in combination of two or more kinds thereof As the polymer (C) containing a vinylpyrrolidone unit, a polymer having a molecular weight distribution that the peak area value having mass average molecular weight of $1 \times 10^6$ or more with respect to the total area value of the peak area is 10% or less in the chromatogram obtained by GPC measurement using a RI detector is preferable from the viewpoint of the physical properties of the porous membrane of the invention.

The molecular weight distribution of the polymer (C) containing a vinylpyrrolidone unit can be controlled by the polymerization time when obtaining a polymer containing a vinylpyrrolidone unit. In other words, it is possible to obtain the polymer (C) having the molecular weight distribution as described above when the polymerization time is from 0.5 to 24 hours.

The polymer (C) which contains a vinylpyrrolidone unit and has the above molecular weight distribution exerts favorable washability (removability) as a phase separation control agent, and thus fine cracks are likely to be generated in the structure of the porous membrane of the invention and there is a tendency that the filtration performance of the porous membrane of the invention can be improved.

The lower limit value of the content of the high molecular weight polymer having a mass average molecular weight of $1 \times 10^6$ or more in the polymer (C) containing a vinylpyrrolidone unit is preferably 5% by mass, more preferably 6% by mass, and even more preferably 7% by mass from the viewpoint that the polymer (C) containing a vinylpyrrolidone unit is easily removed from the porous membrane precursor to be described later and the porous membrane hardly swells with water to blockade the pores and the porous membrane exhibits favorable water permeability as the polymer (C) containing a vinylpyrrolidone unit remains in the porous membrane. In addition, the upper limit value of the content of the high molecular weight polymer is more preferably 20% by mass. There is a tendency that the filtration characteristics can be improved particularly in a case in which the porous membrane is used as a filtration membrane for sewage and wastewater as the content of the high molecular weight polymer having a mass average molecular weight of $1 \times 10^6$ or more in the polymer (C) containing a vinylpyrrolidone unit is set to 5% by mass or more.

The mixing ratio of the respective components may be appropriately adjusted so as to obtain a highly transparent solution. The content of the membrane-forming polymer (A) with respect to 100 parts by mass of the total amount of the membrane-forming polymer (A), the polymer (B), the polymer (C) containing a vinylpyrrolidone unit, and the solvent (III) is preferably from 0.1 to 40 parts by mass. In addition, the content of the polymer (B) with respect to 100 parts by mass of the total amount is preferably from 0.1 to 40 parts by mass. In addition, the content of the polymer (C) containing a vinylpyrrolidone unit with respect to 100 parts by mass of the total amount is preferably from 0.1 to 20 parts by mass. In addition, the content of the solvent (III) with respect to 100 parts by mass of the total amount is preferably from 70 to 99.7 parts by mass. In a highly transparent solution, the phase separation with the elapse of time does not occur and a time dependent change is also small. Incidentally, a part of the constituents in the solution of the invention may be dispersed without dissolving as long as the solution is uniform and can maintain the transparency.

[Membrane-Forming Solution]

In an aspect of the invention, it is preferable that the membrane-forming stock solution contains a resin composition containing the membrane-forming polymer (A), the polymer (B), and the polymer (C) containing a vinylpyrrolidone unit and at least one kind of solvent selected from the group consisting of THF, DMF, DMAc, DMSO, and NMP.

In an aspect of the invention, in the membrane-forming stock solution, the membrane-forming polymer (A), the polymer (B), and the polymer (C) containing a vinylpyrrolidone unit are uniformly dissolved in the solvent (III) described above or the like to form a transparent solution. The transparent solution is a state that the polymer molecules are dispersed or dissolved in a size which does not cause the scattering in the visible light region, and in the transparent solution, the macroscopic phase separation does not occur and a time dependent change is also small.

In an aspect of the invention, it is preferable that the membrane-forming stock solution has a transmittance of light having a wavelength of 400 nm of 70% or more. A porous membrane which has suppressed defects and lot blurs tends to be obtained as a solution having a transmittance of 70% or more is prepared. In addition, the upper limit of the transmittance is not particularly limited as long as it has the effect of the invention, but it is preferably 100% or less.

The membrane-forming stock solution of the invention can be obtained by mixing a resin composition containing the membrane-forming polymer (A) and the polymer (C) containing a vinylpyrrolidone unit and the solvent (III) with the polymer (B).

The mixing ratio of the respective components may be appropriately adjusted so as to obtain a highly transparent membrane-forming stock solution. The content of the membrane-forming polymer (A) with respect to 100 parts by mass of the total amount of the membrane-forming polymer (A), the polymer (B), the polymer (C) containing a vinylpyrrolidone unit, and the solvent (III) is preferably from 0.1 to 40 parts by mass. In addition, the content of the polymer (B) with respect to the total amount is preferably from 0.1 to 40 parts by mass when the total amount is set to 100 parts by mass. In addition, the content of the solvent (III) with respect to 100 parts by mass of the total amount is preferably from 70 to 99.7 parts by mass.

In a highly transparent membrane-forming stock solution, the phase separation with the elapse of time does not occur and a time dependent change is also small. Incidentally, a part of the constituents in the membrane-forming stock solution of the invention may be dispersed without dissolving as long as the membrane-forming stock solution is uniform and can maintain the transparency, namely, a transmittance of light having a wavelength of 400 nm of 70% or more.

Examples of the method for preparing the membrane-forming stock solution of the invention may include a method in which the membrane-forming polymer (A), the polymer (B), and the polymer (C) containing a vinylpyrrolidone unit are collectively mixed into the solvent (III) and dissolved and a method in which the membrane-forming polymer (A), the polymer (B), and the polymer (C) containing a vinylpyrrolidone unit are dissolve in the solvent (III) while adding them little by little.

Incidentally, when obtaining the membrane-forming stock solution of the invention, it is possible to dissolve the membrane-forming polymer (A), the polymer (B), and the polymer (C) containing a vinylpyrrolidone unit while heating the solvent (III) unless the solvent (III) evaporates to be released to the outside of the system. In addition, it is possible to cool the membrane-forming stock solution of the invention if necessary.

Examples of the solvent (III) may include the same ones as the solvent (II). Among these, at least one solvent selected from the group consisting of THF, DMF, DMAc, DMSO, and NMP is preferable from the viewpoint of solubility of the membrane-forming polymer (A), the polymer (B), and the polymer (C) containing a vinylpyrrolidone unit and ease of handling. These solvents may be used singly or in combination of two or more kinds thereof

[Porous Membrane]

In an aspect of the invention, the porous membrane is obtained by a production method which includes a step of removing a part or the whole of the polymer (C) containing a vinylpyrrolidone unit from the membrane-forming stock solution of the invention. In addition, the porous membrane contains the membrane-forming polymer (A) and the polymer (B).

The method for producing the porous membrane of the invention will be described later.

The content of the membrane-forming polymer (A) in the porous membrane of the invention is preferably from 20 to 95 parts by mass with respect to 100 parts by mass of the total amount of the membrane-forming polymer (A) and the polymer (B) which form the porous membrane. There is a tendency that a porous membrane can be obtained when the content of the membrane-forming polymer (A) in the porous film is 20 parts by mass or more.

In addition, there is a tendency that the contact angle of pure water on the surface of the porous membrane can be decreased, namely, set to from 1 to 75° when the content of the membrane-forming polymer (A) is 95 parts by mass or less.

The lower limit value of the content of membrane-forming polymer (A) is more preferably 25 parts by mass, even more preferably 30 parts by mass, and even more preferably 40 parts by mass. The upper limit value of the content of membrane-forming polymer (A) is more preferably 92 parts by mass, even more preferably 90 parts by mass, and even more preferably 85 parts by mass.

In an aspect of the invention, the content of film-membrane-forming in the porous film (A) is preferably from 20 to 95 parts by mass, more preferably from 30 to 90 parts by mass, and even more preferably 40 to 85 parts by mass with respect to the total amount of the membrane-forming polymer (A) and the polymer (B) which form the porous membrane.

The surface of the porous membrane of the invention is hydrophilized as it contains the polymer (B), and thus a treatment by a hydrophilizing agent of the prior art is not necessarily required.

As the method to decrease the contact angle of pure water on the surface of the porous membrane of the invention, for example, a method to obtain the porous membrane using a copolymer obtained by polymerizing a monomer composition in which at least either monomer of the macromonomer (b1) or another monomer (b2) is a monomer having a hydrophilic functional group such as a hydroxyl group or a carboxyl group as the polymer (B). In addition, in an aspect of the invention, as the monomer having a hydrophilic functional group such as a hydroxyl group or a carboxyl group, at least one kind of (meth)acrylic acid ester selected from the group consisting of (meth)acrylic acid, a (meth)acrylic acid ester having a polyethylene glycol unit in the side chain and a (meth)acrylic acid ester having a hydroxyl group is preferable.

In addition, in an aspect of the invention, another monomer (b2) above is preferably at least one kind of (meth)acrylic acid ester selected from the group consisting of (meth)acrylic acid, a (meth)acrylic acid ester having a polyethylene glycol unit in the side chain and a (meth) acrylic acid ester having a hydroxyl group.

There is a tendency that it is possible to obtain a porous membrane in which a polymer segment having a hydrophilic functional group is efficiently unevenly distributed on the surface of the porous membrane as the porous membrane is obtained using the above copolymer.

The upper limit value of the contact angle of pure water on the surface of the porous membrane of the invention is more preferably 70° and even more preferably 65°. In addition, the lower limit value of the contact angle of pure water on the surface of the porous membrane is preferably as low as possible, and it is generally 1°.

The lower limit value of the contact angle of pure water on the surface of the porous membrane of the invention varies depending on the kind of the polymer (A) to be used, and it is generally 20° in the case of using PVDF as the polymer (A).

Examples of the method for producing the porous membrane of the invention may include the following methods.

First, the membrane-forming stock solution of the invention is coagulated in a coagulating liquid to obtain a porous membrane precursor. Thereafter, the solvent (III) remaining in the porous membrane precursor is removed through washing to obtain a porous membrane precursor after washing out solvent. Furthermore, the porous membrane precursor after washing out solvent is washed with a chemical solution which contains an oxidizing agent such as an aqueous solution of sodium hypochlorite or an alkali such as sodium hydroxide to decompose the polymer (C) containing a vinylpyrrolidone unit. It is possible to remove the polymer (C) containing a vinylpyrrolidone unit and the solvent (III) from the porous membrane precursor after washing out solvent by repeating this step several times, and it is possible to obtain the porous membrane of the invention by drying the porous membrane precursor after chemical solution washing thus obtained.

In other words, in an aspect of the invention, a porous membrane obtained by the production method including a step of obtaining a porous membrane precursor by coagulating the membrane-forming stock solution and then decomposing and removing the component (C) remaining in the porous membrane precursor is preferable.

In addition, as the method for decomposing and removing the component (C), a method to wash the porous membrane precursor with a solution containing an oxidizing agent or an alkali is preferable.

As the coagulating liquid used when obtaining the porous membrane precursor, a 0.1 to 50% by mass aqueous solution of the solvent (III) used in the membrane-forming stock solution is preferable from the viewpoint of controlling the pore size of membrane.

The temperature of the coagulating liquid is preferably 10° C. or higher and 90° C. or lower. There is a tendency that the water permeability of the porous membrane of the invention can be improved when the temperature of the coagulating liquid is 10° C. or higher, and there is a tendency that the mechanical strength of the porous membrane of the invention is not impaired when it is 90° C. or lower.

As the method for washing the porous membrane precursor thus obtained, a method in which the porous membrane precursor is immersed in hot water at from 60 to 100° C. and washed to remove the solvent (III) is preferable. At this time, a part of the polymer (C) containing a vinylpyrrolidone unit can also be simultaneously removed. A high effect of washing the porous membrane precursor tends to be obtained when the temperature of hot water is 60° C. or higher, and the porous membrane precursor tends to hardly fuse when the temperature of the hot water is 100° C. or lower.

It is preferable to wash the porous membrane precursor with hot water and then the porous membrane precursor after washing out solvent with a chemical solution such as an aqueous solution of sodium hypochlorite. By virtue of this, the polymer (C) containing a vinylpyrrolidone unit in the inside of the porous membrane is decomposed and removed. It is possible to remove most of the polymer (C) containing a vinylpyrrolidone unit in this stage. In the case of using an aqueous solution of sodium hypochlorite, the concentration thereof is preferably from 10 to 120,000 mg/L. There is a tendency that the flow rate of water permeating through the porous membrane increases and thus it is preferable when the concentration of the aqueous solution of sodium hypochlorite is 10 mg/L or more. There is no upper limit to the concentration of the aqueous solution of sodium hypochlorite, but it is practically sufficient when the concentration is 120,000 mg/L.

In the invention, it is preferable to wash the porous membrane precursor after chemical solution washing with hot water at from 60 to 100° C. several times. By virtue of this, there is a tendency that the residual polymer (C) containing a vinylpyrrolidone unit can be removed.

It is preferable to dry the porous membrane precursor after hot water washing at 60° C. or higher and 120° C. or lower for 1 minute or longer and 24 hours or shorter. It is preferable for industrial production since the time for drying treatment is short to be favorable and the production cost is also suppressed when the drying temperature of the porous membrane precursor after hot water washing is 60° C. or higher. In addition, there is a tendency that porous membrane precursor after hot water washing is not too much shrunk in the drying step and small cracks are also not generated on the surface of the porous membrane and thus it is preferable when the drying temperature of the porous membrane precursor after hot water washing is 120° C. or lower.

Examples of the form of the porous membrane of the invention may include a flat membrane and a hollow fiber membrane.

In a case in which the porous membrane of the invention is a flat membrane, the thickness thereof is preferably from 10 to 1,000 There is a tendency that the elasticity and durability of the porous membrane of the invention can be improved when the thickness is 10 μm or more, and there is a tendency that the porous membrane of the invention can be produced at low cost when the thickness is 1,000 μm or less. In a case in which the porous membrane of the invention is a flat membrane, the lower limit value of the thickness is more preferably 20 μm or more, even more preferably 30 μm or more. The upper limit value of the thickness is more preferably 900 μm or less and even more preferably 800 μm or less.

Here, the "thickness of flat membrane" is a value obtained by measuring the shortest distance between the outer surface and the inner surface in the cross section of the porous membrane using a scanning electron microscope.

Examples of the internal structure of the membrane in the porous membrane of the invention may include a gradient structure in which the size of pores increases in a particular direction in the cross section of the membrane or a structure having homogeneous pores. Particularly, in a case in which the porous membrane is a hollow fiber membrane, it is preferable that one surface of the hollow fiber membrane is most dense and the gradient structure of pores is imparted toward the other surface since suitable separating function can be obtained.

The porous membrane of the invention can have a macrovoid or spherulitic structure in the membrane.

[Hollow Fiber Membrane]

In addition, an aspect of the invention is a hollow fiber membrane constituted by the porous membrane.

In a case in which the porous membrane of the invention is a hollow fiber membrane, the outer diameter of the hollow fiber membrane is preferably from 20 to 2,000 μm. The yarn breakage tends to hardly occur at the time of forming the membrane when the outer diameter of the porous membrane is 20 μm or more. In addition, the hollow shape tends to be easily maintained and the hollow fiber membrane tends to be hardly flattened even when an external pressure is applied thereto when the outer diameter thereof is 2,000 μm or less. The lower limit value of the outer diameter of the hollow fiber membrane is more preferably 30 μm and even more preferably 40 μm. In addition, the upper limit value of the outer diameter of the hollow fiber membrane is more preferably 1,800 μm and even more preferably 1,500 μm.

Here, the "outside diameter of the hollow fiber membrane" refers to a diameter of the cross section of the hollow fiber membrane and is a value measured using a scanning electron microscope or the like.

In a case in which the shape of the porous membrane of the invention is a hollow fiber membrane, the wall thickness of the hollow fiber membrane is preferably from 5 to 500 µm. The yarn breakage tends to hardly occur at the time of forming the membrane when the wall thickness of the hollow fiber membrane is 5 µm or more, and the hollow shape tends to be easily maintained when the wall thickness is 500 µm or less. The lower limit value of the wall thickness of the hollow fiber membranes is preferably 10 µm and more preferably 15 µm. The upper limit value of the wall thickness of the hollow fiber membrane is 480 µm and even more preferably 450 µm.

Here, the "wall thickness of the hollow fiber membrane" refers to a thickness from the outer surface to the inner surface in the cross section of the hollow fiber membrane and is a value measured using an electron microscope or the like.

[Electrolyte Support]

In an aspect of the invention, the electrolyte support is one that is obtained by supporting an electrolyte in the porous membrane of the invention. In other words, an aspect of the invention is an electrolyte support including an electrolyte and a porous membrane.

In addition, a facet of the invention is the use of the porous membrane as an electrolyte support or a method for producing an electrolyte support using the porous membrane as a raw material.

Examples of the electrolyte may include a high molecular weight solution containing a lithium ion.

In an aspect of the invention, examples of the method for producing an electrolyte support may include a production method which includes a step of preparing a lithium ion electrolyte and a step of impregnating the porous membrane of the invention with the lithium ion electrolyte.

The electrolyte support of the invention, for example, can be used in various kinds of batteries such as a gel battery and a solid state battery.

[Separator]

The separator of the invention is one in which the porous membrane of the invention is used as a separation membrane for separating the positive electrode from the negative electrode in a battery such as a lithium-ion battery.

In other words, an aspect of the invention is the use of the porous membrane as a separator or a method for producing a battery such as a lithium-ion battery including the porous membrane.

[Water Treatment Device]

An aspect of the invention is the use of the porous membrane in a water treatment device. The porous membrane of the invention can be suitably used in a water treatment device for drinking water production, water purification treatment, wastewater treatment, and the like.

In an aspect of the invention, examples of the water treatment device using the porous membrane may include a water treatment device 1 illustrated in FIG. 1. The water treatment device 1 of FIG. 1 is one which uses the porous membrane of the invention as the hollow fiber membrane. In addition, FIG. 1 is a perspective view of the water treatment device 1 according to one embodiment of the porous membrane that is one form of the invention.

The water treatment device illustrated in FIG. 1 is equipped with a membrane module unit 3 provided in a membrane separation layer 2 and an air diffuser 4 for membrane washing, a suction pump 5 is connected to the membrane module unit 3, and a blower (not illustrated) is connected to the air diffuser 4. The air diffuser 4 is provided below the membrane module unit 3 and equipped with a plurality of diffusing pipes 6 which are a tubular body and communicate with the blower.

In addition, the membrane module unit 3 is equipped with a plurality of flat-type hollow fiber membrane element 10 having a plurality of hollow fiber membrane 7 which exhibits liquid permeability and is arranged in a sheet shape, a first housing 8 which is fixed on the upper end side of the hollow fiber membrane 7 and disposed upward, and a second housing 9 which is fixed on the lower end side of the hollow fiber membrane 7 and disposed downward, and these flat-type hollow fiber membrane elements 10 are constituted to be installed on the rack 11 in parallel. Here, the hollow fiber membrane 7 is constituted by the porous membrane of the invention.

In other words, in the water treatment device of FIG. 1, the plurality of hollow fiber membranes 7 that are one form of the porous membrane of the invention are formed into a sheet shape by pulling and aligning them, and this sheet-shaped material is fixed at the top and the bottom by the first and second housings 8 and 9 which are provided with a water intake port 12, respectively, to constitute an element.

The first and second housings 8 and 9 respectively have a long rectangular shape in front view. The left end portion of the first housing 8 is provided with the water intake port 12 which protrudes to the left and lets the filtered water flow through, and the water intake port 12 is connected to one end of the piping member 13 which has a crank in a U-shape. The other end of the piping member 13 is connected to the water collecting header 14 disposed above the rack 11.

In the membrane module unit 3, water to be treated in the membrane separation tank 2 is suction-filtered by the suction pump 5 via the pores of the hollow fiber membrane 7 to separate the water to be treated into solid and liquid. The treated water that is treated in each flat-type hollow fiber membrane element 10 passes through piping member 13 and is collected in the water collecting header 14 to meet together.

Incidentally, in an aspect of the invention, a film-shaped porous membrane (flat membrane) that is another form of the porous membrane of the invention may be used instead of the sheet-shaped material prepared by pulling and aligning the plurality of hollow fiber membranes 7.

In an aspect of the invention, in the water treatment device 1 which uses the porous membrane as the hollow fiber membrane 7, the flat-type hollow fiber membrane element 10 is fixed to the rack 11, and as illustrated in FIG. 1, the rack 11 is constituted by a plurality of frame members. The rack 11 includes a left upper frame 27 which construct a cross frame 26 at the top of left and right upright frames 25L and 25R to stand up from the left and right of the air diffuser 4 and extends from the top of the left upright frame 25L in the continuously provided direction of the element, a left lower part frame 28 which extends from the top of the left upright frame 25L in the continuously provided direction of the element, a right upper frame 29 which extends from the top of the left upright frame 25R in the continuously provided direction of the element, a right lower frame 30 which extends from the bottom of the right upright frame 25R in the continuously provided direction of the element, and frames (not illustrated) which are positioned on the back side of the paper and the same as the left and right upright frames 25L and 25R.

The water treatment device using the porous membrane that is an aspect of the invention as a hollow fiber membrane exhibits high water permeating performance (flux), and thus it exhibits excellent water treatment capacity per unit time.

In addition, the invention has the following facets.

A resin composition (X) including the following component (A), component (B), and component (C):

component (A): a PVDF polymer having a mass average molecular weight of from 100,000 to 2,000,000, component (B): a polymer (B) obtained by polymerizing a monomer composition composed of a macromonomer (b1) having an unsaturated double bond at a terminal of a methyl methacrylate segment and a number average molecular weight of from 1,000 to 1,000,000 and 2-hydroxyethyl acrylate (b2), and component (C): polyvinylpyrrolidone;

a membrane-forming stock solution (Y) including the resin composition (X) and a solvent capable of dissolving the membrane-forming polymer (A);

a porous membrane (Z) obtained by removing polyvinylpyrrolidone from a porous membrane precursor obtained by coagulating the membrane-forming stock solution (Y); and use of the porous membrane (Z) in a hollow fiber membrane, an electrolyte support, a separator, or a water treatment device.

EXAMPLES

Hereinafter, the invention will be explained in detail with reference to Examples. Incidentally, in the following description, the composition and structure of the macromonomer (b1) and the polymer, Mw of the polymer, and Mn and Mw/Mn of the macromonomer (b1) and the polymer were evaluated by the following methods.

In addition, in the following description, the terms "parts" and "%" respectively indicate the terms "part by mass" and "% by mass".

(1) Composition and Structure of Macromonomer (b1) and Polymer

The composition and structure of the macromonomer (b1) and the polymer were analyzed by $^1$H-NMR (product name: JNM-EX270 manufactured by JEOL Ltd.)

(2) Mw of Membrane-Forming Polymer (A)

Mw of the membrane-forming polymer (A) was determined using a GPC ("HLC-8020" (trade name) manufactured by TOSOH CORPORATION) under the following condition.

Column: TSK GUARD COLUMN α (7.8 mmφ×40 mm) and three of TSK-GEL α-M (7.8 mmφ×300 mm) connected in series Eluent: LiBr 20 mM DMF solution Measuring temperature: 40° C.

Flow rate: 0.1 mL/minute

Incidentally, Mw was determined using the calibration curve created using polystyrene standards manufactured by TOSOH CORPORATION (nine kinds of Mp (peak top molecular weight) of 76,969,900, 2,110,000, 1,260,000, 775,000, 355,000, 186,000, 19,500, 1,050 and styrene monomer (M=104) manufactured by NS styrene monomer Co., Ltd.).

(3) Mn and Mw/Mn of Macromonomer (b1), Polymer (B), and Polymer (C) Containing Vinylpyrrolidone Unit Mn and Mw/Mn of the macromonomer (b1) were determined using a GPC ("HLC-8020" (trade name) manufactured by TOSOH CORPORATION) under the following condition.

Column: TSK GUARD COLUMN SUPER HZ-L (4.6 mmφ×35 mm) and two of TSK-GEL SUPER HZM-N (6.0 mmφ×150 mm) connected in series Eluent: LiBr 20 mM DMF solution Measuring temperature: 40° C.

Flow rate: 0.6 mL/minute

Incidentally, Mw and Mn were determined using the calibration curve created using polymethyl methacrylate (4 kinds of Mp (peak top molecular weight) of 141,500, 55,600, 10,290, and 1,590) manufactured by Polymer Laboratories, Varian, Inc.

(4) Measurement of Transmittance of Solution

The prepared solution was added into a cuvette having an inner diameter of 1 cm long×1 cm wide and the measurement of transmittance at 400 nm was conducted using a UV-visible spectrophotometer (product name: U-3300 manufactured by Hitachi High-Technologies Corporation). The transparency of the solution was evaluated according to the following criteria.

◯: transmittance of solution is 90% or more

Δ: transmittance of solution is 70% or more and less than 90% and x: transmittance of solution is less than 70%

(5) Contact Angle

The contact angle of pure water on the porous membrane was measured by the following method.

The porous membrane was placed on the sample table of a contact angle measuring apparatus (product name: DSA-10 manufactured by Kruss GmbH). Subsequently, a photograph of the state of the water drop (10 μL) in 3 seconds after dropping a water drop of pure water (for LC/MS, manufactured by Wako Pure Chemical Industries, Ltd.) on the surface of the porous membrane was taken using the CCD camera in the contact angle measuring apparatus. The contact angle of the water drop in the photograph thus obtained was determined by the automatic measurement using the image processing program incorporated in the contact angle measuring apparatus.

(6) Surface Observation

A range of 500 μm×500 μm on the surface of the porous membrane was selected at arbitrary 5 locations, and the state of the holes in them was observed using a scanning electron microscope (product name: JSM-7400 manufactured by Hitachi Kokusai Electronic Inc.) and evaluated according to the criteria.

◯: hole having diameter 1 μm or more was not confirmed.

x: hole having diameter 1 μm or more was confirmed.

(7) Fine Particle Rejection Rate

The porous membrane specimen was cut into a circle having a diameter of 4.2 cm and immersed in ethanol (manufactured by Wako Pure Chemical Industries, Ltd., special grade reagent) for 20 minutes to be impregnated with ethanol. Subsequently, the porous membrane specimen impregnated with ethanol was immersed in deionized water at least for 2 hours and the interposed between the stainless holders with tank (KST-47 (trade name) manufactured by Toyo Roshi Kaisha Ltd., effective membrane area: 12.5 $cm^2$).

Subsequently, the evaluating stock solution prepared by dispersing polystyrene latex particles having an average particle size of 0.132 μm (manufactured by MAGSPHERE INC., nominal particle size: 0.132 μm) in deionized water to have a concentration of 25 ppm was filled in the tank and filtered through the interposed porous membrane at a measurement pressure of 0.1 MPa, and the rejection rate was determined from the absorbance of the evaluating stock solution and the filtrate at a wavelength 320 nm by $Rjc=[(A1-A2)/A1]\times 100$ Rjc: fine particle rejection rate (%)
A1: absorbance of evaluating stock solution (abs) and
A2: absorbance of filtrate (abs).

For the measurement of absorbance, a spectrophotometer (LAMBDA850 manufactured by PerkinElmer Co., Ltd.) was used.

Synthesis Example 1

Synthesis of Cobalt Chain Transfer Agent CoBF-1

Into a reactor equipped with a stirrer, 1.00 g of cobalt (II) acetate tetrahydrate (manufactured by Wako Pure Chemical Industries, Ltd., Wako special grade), 1.93 g of diphenyl glyoxime (manufactured by TOKYO CHEMICAL INDUSTRY CO., LTD., EP grade), and 80 mL of diethyl ether (manufactured by KANTO CHEMICAL CO., INC., special grade) which was purged with nitrogen for 30 minutes or longer so as to be deoxygenated were introduced under a nitrogen atmosphere and stirred at room temperature for 30 minutes to obtain a mixture. Subsequently, 10 mL of boron trifluoride-diethyl ether complex (manufactured by TOKYO CHEMICAL INDUSTRY CO., LTD., EP grade) was added to the mixture thus obtained and further stirred for 6 hours to obtain a reaction product. The reaction product thus obtained was filtered and the solid thus obtained washed with diethyl ether (manufactured by KANTO CHEMICAL CO., INC., special grade) and vacuum-dried for 15 hours, thereby obtaining 2.12 g of the cobalt chain transfer agent CoBF-1 that was a red-brown solid.

Synthesis Example 2

Synthesis of Dispersant 1

Into a reactor equipped with a stirrer, a cooling tube, and a thermometer, 61.6 parts of a 17% aqueous solution of potassium hydroxide, 19.1 parts of methyl methacrylate (trade name: ACRYESTER M manufactured by MITSUBISHI RAYON CO., LTD.) and 19.3 parts of deionized water were introduced. Subsequently, the liquid was stirred in the reactor at room temperature, the exothermic peak was confirmed, and the liquid was then further stirred for 4 hours to obtain a reaction solution. Thereafter, the reaction solution was cooled to room temperature, thereby obtaining an aqueous solution of potassium methacrylate.

Subsequently, into a polymerization apparatus equipped with a stirrer, a cooling tube, and a thermometer, 900 parts of deionized water, 70 parts of a 42% aqueous solution of sodium 2-sulfoethyl methacrylate (trade name: ACRYESTER SEM-Na manufactured by MITSUBISHI RAYON CO., LTD.), 16 parts of the above aqueous solution of potassium methacrylate, and 7 parts of methyl methacrylate (trade name: ACRYESTER M manufactured by MITSUBISHI RAYON CO., LTD.) were introduced and stirred, and the temperature was raised to 50° C. while purging the inside of the polymerization apparatus with nitrogen. Thereinto, 0.053 parts of 2,2'-azobis(2-methyl propionamidine)dihydrochloride (trade name: V-50 manufactured by Wako Pure Chemical Industries, Ltd.) was added as the polymerization initiator, and the temperature was further raised to 60° C. After the polymerization initiator was introduced, 1.4 parts of methyl methacrylate (trade name: ACRYESTER M manufactured by MITSUBISHI RAYON CO., LTD.) was separately added thereto for every 15 minutes five times in total. Thereafter, the liquid in the polymerization apparatus was held at 60° C. for 6 hours while stirring and then cooled to room temperature, thereby obtaining the dispersant 1 that was a transparent aqueous solution and had a solid content of 8%.

Synthesis Example 3

Synthesis of Macromonomer (b1-1)

Into a flask equipped with a cooling tube, 100 parts of methyl methacrylate (trade name: ACRYESTER M manufactured by MITSUBISHI RAYON CO., LTD.), 100 parts of toluene (manufactured by Wako Pure Chemical Industries, Ltd., Wako first grade), and 0.00075 part of the CoBF-1 were introduced. The CoBF-1 was dissolved in a state that the liquid in the flask was heated to 70° C., and the inside of the flask was purged with nitrogen by nitrogen bubbling. Subsequently, 1 part of AIBN was added thereto, the flask was then held for 6 hours in a state that the internal temperature thereof was maintained at 70° C. to complete the polymerization, thereby obtaining a polymerization reaction product. After this, the polymerization reaction product was reprecipitated with a large amount of n-hexane (manufactured by Wako Pure Chemical Industries, Ltd., reagent grade). The polymer that was precipitated by reprecipitation was recovered and vacuum-dried at 50° C. and 50 mmHg (6.67 kPa) or lower, thereby obtaining the macromonomer (b1-1). Mn of the macromonomer (b1-1) was 12,200, and Mw/Mn thereof was 1.8. The introduction rate of the terminal double bond of the macromonomer (b1-1) was approximately 100%. The macromonomer (b1-1) was one represented by Formula (1) above in which R was a methyl group.

Synthesis Example 4

Synthesis of Macromonomer (b1-2)

Into a flask equipped with a cooling tube, 100 parts of methyl methacrylate (trade name: ACRYESTER M manufactured by MITSUBISHI RAYON CO., LTD.), 150 parts of deionized water, 1.39 parts of sodium sulfate, 1.53 parts of a dispersant, and 0.00075 part of the CoBF-1 were introduced. The CoBF-1 was dissolved in a state that the liquid in the flask was heated to 70° C., and the inside of the flask was purged with nitrogen by nitrogen bubbling. Subsequently, 1 part of AIBN was added thereto, the flask was then held for 6 hours in a state that the internal temperature thereof was maintained at 70° C. to complete the polymerization, thereby obtaining a polymerization reaction product. After this, the polymerization reaction product was cooled to room temperature and further filtered to recover a polymer. The polymer thus obtained was washed with water and vacuum-dried at 50° C. for the night, thereby obtaining the macromonomer (b1-2). Mn of the macromonomer (b1-2) was 11,000, and Mw/Mn thereof was 2.0. The introduction rate of the terminal double bond of the macromonomer (b1-2) was approximately 100%. The macromonomer (b1-2) was one represented by Formula (1) above in which R was a methyl group.

Synthesis Example 5

Synthesis of Polymer Containing Vinylpyrrolidone Unit (C-1)

Into a flask equipped with a cooling tube, 500 parts of 1-vinyl-2-pyrrolidone (manufactured by Wako Pure Chemical Industries, Ltd., Wako first grade) and 750 parts of dimethylformamide (manufactured by Wako Pure Chemical Industries, Ltd., Wako first grade) were introduced, and the inside of the flask was purged with nitrogen by nitrogen bubbling. Subsequently, 0.5 part of AIBN (manufactured by Wako Pure Chemical Industries, Ltd., Wako special grade) was added thereto, the flask was then held for 4 hours in a state that the internal temperature was maintained at 70° C., subsequently the internal temperature was raised to 80° C., and the flask was then held for 30 minutes to complete the polymerization, thereby obtaining a polymerization reaction product. The polymerization reaction product was cooled to room temperature and reprecipitated with a large amount of ethyl acetate (manufactured by Wako Pure Chemical Industries, Ltd., reagent special grade). The polymer that was precipitated by reprecipitation was recovered and vacuum-dried for the night under the condition of 50° C. and 50 mmHg (6.67 kPa) or lower, thereby obtaining polyvinylpyrrolidone as the polymer (C-1) containing a vinylpyrrolidone unit. Mn of polyvinylpyrrolidone was 66,000, and Mw/Mn thereof was 2.5.

Synthesis Example 6

Synthesis of Polymer (B-1)

Into a flask equipped with a cooling tube, a monomer composition containing 95 parts of the macromonomer (b1-1), 5 parts of HEA (2-hydroxyethyl acrylate (manufactured by Wako Pure Chemical Industries, Ltd., Wako first grade)) as another monomer (b2), and 150 parts of DMAc (N,N-dimethylacetamide, manufactured by Wako Pure Chemical Industries, Ltd., Wako special grade) as the solvent (II) was introduced, and the inside of the flask was purged with nitrogen by nitrogen bubbling. Subsequently, the monomer composition was heated, 0.1 part of AIBN (manufactured by Wako Pure Chemical Industries, Ltd., Wako special grade) as the radical polymerization initiator was added to the monomer composition in a state that the internal temperature was maintained at 70° C., the flask was then held for 4 hours, subsequently the internal temperature was raised to 80° C., and the flask was then held for 30 minutes to complete the polymerization, thereby obtaining a polymerization reaction product. After this, the polymerization reaction product was cooled to room temperature and reprecipitated with a large amount of hexane (manufactured by Wako Pure Chemical Industries, Ltd., reagent special grade). The polymer that was precipitated by reprecipitation was recovered and vacuum-dried for the night under the condition of 50° C. and 50 mmHg (6.67 kPa) or lower, thereby obtaining the polymer (B-1). The yield of the polymer (B-1) thus obtained was approximately 100%. Mn of the polymer (B-1) was 4,600, and Mw/Mn thereof was 4.6. The evaluation results are presented in Table 1.

TABLE 1

| | | Macromonomer (b-1) | | | Another monomer (b-2) | | | Number average molecular weight (Mn) | Molecular weight distribution (Mw/Mn) |
|---|---|---|---|---|---|---|---|---|---|
| Synthesis Example | Sample name | (b-1-1) (parts by mass) | (b-1-2) (parts by mass) | MMA (parts by mass) | HEA (parts by mass) | 4HBA (parts by mass) | PME-400 (parts by mass) | | |
| Synthesis Example 4 | (B-1) | 95 | | | 5 | | | 4600 | 4.6 |
| Synthesis Example 5 | (B-2) | 90 | | | 10 | | | 6800 | 4.3 |
| Synthesis Example 6 | (B-3) | 80 | | | 20 | | | 9700 | 4.5 |
| Synthesis Example 7 | (B-4) | 90 | | | | 10 | | 4100 | 5.0 |
| Synthesis Example 8 | (B-5) | 70 | | | | 30 | | 9900 | 4.4 |
| Synthesis Example 9 | (B-6) | | 95 | | 5 | | | 12300 | 3.2 |
| Synthesis Example 10 | (B-7) | | 90 | | 10 | | | 13200 | 3.6 |
| Synthesis Example 11 | (B-8) | | 80 | | 20 | | | 16000 | 3.8 |
| Synthesis Example 12 | (B-9) | | 70 | | 30 | | | 35000 | 2.6 |
| Synthesis Example 13 | (B-10) | | 50 | | 50 | | | 62000 | 2.6 |
| Synthesis Example 14 | (B'-1) | | | 90 | 10 | | | 196900 | 3.1 |
| Synthesis Example 15 | (B'-2) | | | 50 | 50 | | | 178300 | 1.5 |
| Synthesis Example 16 | (B'-3) | | | 90 | | 10 | | 181300 | 1.4 |
| Synthesis Example 17 | (B'-4) | | | 90 | | | 10 | 35400 | 1.4 |
| Synthesis Example 18 | (B'-5) | | | 50 | | | 90 | 69400 | 1.4 |

The abbreviations in Table 1 indicate the following compounds.

MMA: Methyl methacrylate (trade name: ACRYESTER M manufactured by MITSUBISHI RAYON CO., LTD.)

HEA: 2-hydroxyethyl acrylate (manufactured by Wako Pure Chemical Industries, Ltd., Wako first grade)

4HBA: 4-hydroxybutyl acrylate (manufactured by The Nippon Synthetic Chemical Industry Co., Ltd.) and PME-400 (BLEMMER PME-400 (trade name) manufactured by NOF CORPORATION)

Incidentally, the term "solution" described in Tables 1 to 5 refers to the "membrane-forming stock solution".

Synthesis Examples 7 to 18

Synthesis of Polymers (B-2) to (B-10) and (B'-1) to (B'-5)

The polymers (B-2) to (B-10) and (B'-1) to (B'-5) were obtained by the same method as in Synthesis Example 6 except that the monomer compositions having the composition presented in Table 1 were used. The yield of the polymers (B-2) to (B-10) and (B'-1) to (B'-5) thus obtained was approximately 100%. Evaluation results of the polymers (B-2) to (B-10) and (B'-1) to (B'-5) are presented in Table 1.

Example 1

In a glass container, 20 parts of the Kynar301F (trade name, manufactured by Arkema, PVDF homopolymer, Mw=550,000) as the membrane-forming polymer (A), 0.4 part of the polymer (B-1) as the polymer (B), 4 parts of polyvinylpyrrolidone (PVP) as the polymer (C) containing a vinyl pyrrolidone unit, and 70 parts of DMF (manufactured by Wako Pure Chemical Industries, Ltd., special grade reagent) as the solvent (III) were blended and stirred at 50° C. for 10 hours using a stirrer, thereby preparing a solution. The transmittance of the solution thus obtained was measured, and as a result, the total light transmittance at 400 nm was 90% or more to exhibit favorable transparency. The evaluation results are presented in Table 2.

TABLE 2

| Example | Membrane-forming polymer (A) (parts by mass) | Polymer (B) (parts by mass) | | Polymer (C) (parts by mass) | | Solvent (III) (parts by mass) | | Transparency of solution |
|---|---|---|---|---|---|---|---|---|
| Example 1 | Kynar301F | 20 | (B-2) | 0.4 | (PVP-1) | 4 | DMF | 70 | ○ |
| Example 2 | Kynar301F | 16 | (B-3) | 0.2 | (PVP-1) | 4 | DMF | 70 | ○ |
| Example 3 | Kynar301F | 16 | (B-1) | 0.2 | (PVP-1) | 4 | DMF | 70 | ○ |
| Example 4 | Kynar301F | 16 | (B-3) | 0.4 | (PVP-1) | 4 | DMF | 70 | ○ |
| Example 5 | Kynar301F | 16 | (B-1) | 0.4 | (PVP-1) | 4 | DMF | 70 | ○ |
| Example 6 | Kynar301F | 16 | (B-3) | 0.8 | (PVP-1) | 4 | DMF | 70 | ○ |
| Example 7 | Kynar301F | 16 | (B-1) | 0.8 | (PVP-1) | 4 | DMF | 70 | ○ |
| Example 8 | Kynar301F | 16 | (B-3) | 1.6 | (PVP-1) | 4 | DMF | 70 | ○ |
| Example 9 | Kynar301F | 16 | (B-1) | 1.6 | (PVP-1) | 4 | DMF | 70 | ○ |
| Example 10 | Kynar301F | 16 | (B-1) | 3.2 | (PVP-1) | 4 | DMF | 70 | Δ |
| Example 11 | Kynar301F | 12 | (B-3) | 0.4 | (PVP-1) | 8 | DMF | 70 | ○ |
| Example 12 | Kynar301F | 12 | (B-1) | 0.4 | (PVP-1) | 8 | DMF | 70 | ○ |
| Example 13 | Kynar301F | 12 | (B-3) | 0.8 | (PVP-1) | 8 | DMF | 70 | ○ |
| Example 14 | Kynar301F | 12 | (B-1) | 0.8 | (PVP-1) | 8 | DMF | 70 | ○ |
| Example 15 | Kynar301F | 12 | (B-3) | 1.6 | (PVP-1) | 8 | DMF | 70 | ○ |
| Example 16 | Kynar301F | 12 | (B-1) | 1.6 | (PVP-1) | 8 | DMF | 70 | ○ |
| Example 17 | Kynar301F | 12 | (B-3) | 3.2 | (PVP-1) | 8 | DMF | 70 | ○ |
| Example 18 | Kynar301F | 12 | (B-1) | 3.2 | (PVP-1) | 8 | DMF | 70 | ○ |
| Example 19 | Kynar301F | 16 | (B-4) | 0.1 | (PVP-1) | 4 | DMAc | 70 | ○ |
| Example 20 | Kynar301F | 16 | (B-5) | 0.1 | (PVP-1) | 4 | DMAc | 70 | ○ |
| Example 21 | Kynar301F | 16 | (B-4) | 0.4 | (PVP-1) | 4 | DMAc | 70 | ○ |
| Example 22 | Kynar301F | 16 | (B-5) | 0.4 | (PVP-1) | 4 | DMAc | 70 | Δ |
| Example 23 | Kynar301F | 16 | (B-4) | 1.6 | (PVP-1) | 4 | DMAc | 70 | ○ |
| Example 24 | Kynar301F | 12 | (B-4) | 0.1 | (PVP-1) | 8 | DMAc | 70 | ○ |
| Example 25 | Kynar301F | 12 | (B-5) | 0.1 | (PVP-1) | 8 | DMAc | 70 | ○ |
| Example 26 | Kynar301F | 12 | (B-4) | 0.4 | (PVP-1) | 8 | DMAc | 70 | ○ |
| Example 27 | Kynar301F | 12 | (B-5) | 0.4 | (PVP-1) | 8 | DMAc | 70 | ○ |
| Example 28 | Kynar301F | 12 | (B-4) | 1.6 | (PVP-1) | 8 | DMAc | 70 | ○ |
| Example 29 | Kynar301F | 16 | (B-1) | 0.8 | (PVP-1) | 4 | NMP | 70 | ○ |
| Example 30 | Kynar301F | 16 | (B-2) | 0.8 | (PVP-1) | 4 | NMP | 70 | ○ |
| Example 31 | Kynar301F | 16 | (B-3) | 0.8 | (PVP-1) | 4 | NMP | 70 | ○ |
| Example 32 | Kynar301F | 16 | (B-6) | 0.8 | (PVP-1) | 4 | NMP | 70 | ○ |
| Example 33 | Kynar301F | 16 | (B-7) | 0.8 | (PVP-1) | 4 | NMP | 70 | ○ |
| Example 34 | Kynar301F | 16 | (B-8) | 0.8 | (PVP-1) | 4 | NMP | 70 | ○ |
| Example 35 | Kynar301F | 12 | (B-9) | 0.4 | (PVP-1) | 8 | DMAc | 70 | ○ |
| Example 36 | Kynar301F | 16 | (B-9) | 1.0 | (PVP-1) | 4 | DMAc | 70 | ○ |
| Example 37 | Kynar301F | 12 | (B-10) | 0.4 | (PVP-1) | 8 | DMAc | 70 | Δ |

The abbreviations in Table 2 indicate the following compounds.

Kynar301F: PVDF homopolymer (trade name, manufactured by Arkema, Mw=600,000)

NMP: N-methylpyrrolidone (manufactured by Wako Pure Chemical Industries, Ltd., Wako special grade)

DMF: N,N-dimethylformamide (manufactured by Wako Pure Chemical Industries, Ltd., special grade)

DMAc: N,N-dimethylacetamide (manufactured by Wako Pure Chemical Industries, Ltd., Wako first grade)

Examples 2 to 37

The solutions were obtained in the same manner as in Example 1 except that those presented in Table 2 were used as the polymer (B') and the solvent (III). The evaluation results are presented in Table 2.

Comparative Example 1

Into a glass container, 16 parts of the Kynar301F as the membrane-forming polymer (A), 0.8 parts of the polymer (B'-4) as the polymer (B'), 4 parts of polyvinylpyrrolidone as the polymer (C) containing a vinylpyrrolidone unit, and 70 parts of DMF the solvent (III) were added and stirred at 50° C. for 10 hours using a stirrer, thereby preparing a solution. The transmittance of the solution thus obtained was measured, and as a result, the total light transmittance at 400 nm was less than 70% not to exhibit favorable transparency, and it was a turbid solution. The evaluation results are presented in Table 3.

In Comparative Example 2, the compatibility was poor since MMA was used instead of the macromonomer (b-1), and thus it was not possible to obtain a transparent solution.

In Comparative Example 3, the compatibility was poor since MMA was used instead of the macromonomer (b-1), and thus it was not possible to obtain a transparent solution.

In Comparative Example 4, the compatibility was poor since MMA was used instead of the macromonomer (b-1), and thus it was not possible to obtain a transparent solution.

In Comparative Example 5, the compatibility was poor since MMA was used instead of the macromonomer (b-1), and thus it was not possible to obtain a transparent solution.

In Comparative Example 6, the compatibility was poor since MMA was used instead of the macromonomer (b-1), and thus it was not possible to obtain a transparent solution.

Example 38

The solution 26 prepared in Example 26 was used, the solution 26 was coated on a glass substrate using a bar coater so as to have a thickness of 125 The glass substrate thus coated was held at room temperature for 3 minutes and then immersed in hot water which was a poor solvent at 80° C. to remove the solvent (III), thereby fabricating a porous membrane precursor. This porous membrane precursor was sufficiently washed with pure water and dried for the night. The contact angle of pure water on the porous membrane precursor obtained by drying was measured. Subsequently, the porous membrane precursor was immersed in an aque-

TABLE 3

| Example | Membrane-forming polymer (A) (parts by mass) | | Polymer (B') (parts by mass) | | Polymer (C) (parts by mass) | | Solvent (III) (parts by mass) | | Transparency of solution |
|---|---|---|---|---|---|---|---|---|---|
| Comparative Example 1 | Kynar301F | 16 | (B'-4) | 0.8 | (PVP-1) | 4 | DMF | 70 | X |
| Comparative Example 2 | Kynar301F | 16 | (B'-5) | 0.8 | (PVP-1) | 4 | DMF | 70 | X |
| Comparative Example 3 | Kynar301F | 12 | (B'-2) | 0.4 | (PVP-1) | 8 | DMF | 70 | X |
| Comparative Example 4 | Kynar301F | 12 | (B'-3) | 0.4 | (PVP-1) | 8 | DMF | 70 | X |
| Comparative Example 5 | Kynar301F | 16 | (B'-1) | 0.8 | (PVP-1) | 4 | DMF | 70 | X |
| Comparative Example 6 | Kynar301F | 12 | (B'-2) | 0.4 | (PVP-1) | 4 | DMAc | 70 | X |

The abbreviations in Table 3 indicate the following compounds.

Kynar301F: PVDF homopolymer (trade name, manufactured by Arkema, Mw=600,000)

NMP: N-methylpyrrolidone (manufactured by Wako Pure Chemical Industries, Ltd., Wako special grade)

DMF: N,N-dimethylformamide (manufactured by Wako Pure Chemical Industries, Ltd., special grade) and DMAc: N,N-dimethylacetamide (manufactured by Wako Pure Chemical Industries, Ltd., Wako first grade)

Comparative Examples 2 to 6

The solutions were obtained in the same manner as in Comparative Example 1 except that those presented in Table 3 were used as the polymer (B') and the solvent (c). The evaluation results are presented in Table 3.

In Comparative Example 1, the compatibility was poor since MMA was used instead of the macromonomer (b-1), and thus it was not possible to obtain a transparent solution.

ous solution of sodium hypochlorite (manufactured by Wako Pure Chemical Industries, Ltd., effective chlorine concentration: 5.0+%) for 6 hours and then washed with flowing water to conduct the decomposition and washing treatment of polyvinylpyrrolidone, thereby fabricating a porous membrane. The contact angle of pure water on the porous membrane was measured. The evaluation results are presented in Table 4.

Examples 39 to 41

The porous membrane precursors and the porous membranes were fabricated in the same manner as in Example 38 except that the solutions presented in Table 4 were used instead of the solution 26, and the contact angle of pure water on each of the porous membrane precursors and the porous membranes was measured. The evaluation results are presented in Table 4.

Comparative Example 7 and Comparative Example 9

The porous membrane precursors and the porous membranes were fabricated in the same manner as in Example 38 except that the solutions presented in Table 4 were used instead of the solution 26, and the contact angle of pure water on each of the porous membrane precursors and the porous membranes was measured. The evaluation results are presented in Table 4.

The porous membrane obtained in Comparative Example 7 did not exhibit favorable hydrophilicity since the polymer (B) was not contained in the solution used, and the contact angle was 66° to be higher than that in Example 39.

The porous membrane obtained in Comparative Example 9 did not exhibit favorable hydrophilicity since the polymer (B) was not contained in the solution used, and the contact angle was 88° to be higher than that in Example 37.

Comparative Example 8

The porous membrane precursors and the porous membranes were fabricated in the same manner as in Example 35 except that a 14.6% solution of PVDF obtained by dissolving only the Kynar301F (trade name) manufactured by Arkema in DMAc was used instead of the solution 26, and the contact angle of pure water on each of the porous membrane precursor and the porous membrane was measured. The evaluation results are presented in Table 4.

The porous membrane thus obtained exhibited low hydrophilicity since it did not contain the polymer (B) and the polymer (C) containing a vinylpyrrolidone unit, and the contact angle was great.

Example 42

The porous membrane was obtained in the same manner as in Example 38 except that the solution 11 prepared in Example 11 was used and a 5% aqueous solution of DMF as a poor solvent was used instead of hot water. The surface of the porous membrane thus obtained was observed and a hole having a diameter of 1 μm or more was not observed, and thus a highly uniform porous membrane was obtained. The evaluation results are presented in Table 5.

Examples 32 to 49

The porous membranes were obtained in the same manner as in Example 38 except that the solutions and the poor solvents presented in Table 5 were used. The evaluation results are presented in Table 5.

Comparative Examples 10 to 12

The porous membranes were obtained in the same manner as in Example 38 except that the solutions and the poor solvents presented in Table 5 were used. The evaluation results are presented in Table 5.

TABLE 5

|  | Solution used | Poor solvent | Surface observation |
| --- | --- | --- | --- |
| Example 42 | Example 11 | 5 wt % aqueous solution of DMF | ○ |
| Example 43 | Example 12 | 5 wt % aqueous solution of DMF | ○ |
| Example 44 | Example 26 | 5 wt % aqueous solution of DMAc | ○ |
| Example 45 | Example 27 | 5 wt % aqueous solution of DMAc | ○ |
| Example 46 | Example 33 | 5 wt % aqueous solution of NMP | ○ |
| Example 47 | Example 34 | 5 wt % aqueous solution of NMP | ○ |
| Example 48 | Example 35 | 30 wt % aqueous solution of DMAc | ○ |
| Example 49 | Example 36 | 30 wt % aqueous solution of DMAc | ○ |
| Example 50 | Example 37 | 30 wt % aqueous solution of DMAc | ○ |
| Comparative Example 10 | Comparative Example 1 | 5 wt % aqueous solution of DMF | X |
| Comparative Example 11 | Comparative Example 2 | 5 wt % aqueous solution of DMF | X |
| Comparative Example 12 | Comparative Example 6 | 30 wt % aqueous solution of DMAc | X |

TABLE 4

|  |  | Contact angle of pure water (°) | |
| --- | --- | --- | --- |
|  | Solution used | Before treated with sodium hypochlorite | After treated with sodium hypochlorite |
| Example 38 | Example 26 | 52 | 51 |
| Example 39 | Example 35 | 60 | 65 |
| Example 40 | Example 36 | 60 | 55 |
| Example 41 | Example 37 | 70 | 20 |
| Comparative Example 7 | Comparative Example 4 | 65 | 66 |
| Comparative Example 8 | Only PVDF | 112 | 111 |
| Comparative Example 9 | Comparative Example 6 | 88 | 84 |

In Comparative Example 10, MMA was used instead of the macromonomer (b-1) and the porous membrane was fabricated using the solution 1' of Comparative Example 1 which exhibited poor compatibility and was not transparent, and thus a large hole having a diameter of 1 μm or more was formed and it was not possible to obtain a highly uniform porous membrane.

In Comparative Example 11, MMA was used instead of the macromonomer (b-1) and the porous membrane was fabricated using the solution 2' of Comparative Example 2 which exhibited poor compatibility and was not transparent, and thus a large hole having a diameter of 1 μm or more was formed and it was not possible to obtain a highly uniform porous membrane.

In Comparative Example 12, MMA was used instead of the macromonomer (b-1) and the porous membrane was fabricated using the solution 6' of Comparative Example 6 which exhibited poor compatibility and was not transparent, and thus a large hole having a diameter of 1 μm or more was formed and it was not possible to obtain a highly uniform porous membrane.

Examples 51 to 53

The rejection rate was measured using the porous membranes fabricated in Examples 48 to 50. The evaluation results are presented in Table 6.

Comparative Example 13

The rejection rate was measured by the same method as in Example 51 except that the porous membrane presented in Table 6 was used. The evaluation results are presented in Table 6.

In Comparative Example 13, the porous membrane of Example 12 in which a large hole having a diameter of 1 μm or more was formed and thus it was not possible to obtain a highly uniform porous membrane was used, and thus it was not possible to completely reject the latex particles of 0.132 μm and the rejection rate was a low value of 64.3%.

TABLE 6

| | Porous membrane used | Rejection rate (%) |
|---|---|---|
| Example 51 | Example 35 | 99.7 |
| Example 52 | Example 36 | 99.0 |
| Example 53 | Example 37 | 98.9 |
| Comparative Example 13 | Example 12 | 64.3 |

EXPLANATIONS OF LETTERS OR NUMERALS

1 WATER TREATMENT DEVICE
2 MEMBRANE SEPARATION LAYER
3 MEMBRANE MODULE UNIT
4 AIR DIFFUSER
5 SUCTION PUMP
6 DIFFUSING PIPE
7 HOLLOW FIBER MEMBRANE
8 FIRST HOUSING
9 SECOND HOUSING
10 FLAT-TYPE HOLLOW FIBER MEMBRANE ELEMENT AND
12 WATER INTAKE PORT

The invention claimed is:

1. A resin composition comprising the following component (A), and component (B);

component (A): a membrane-forming polymer,
component (B): a polymer obtained by polymerizing a monomer composition containing a (meth)acrylic acid ester macromonomer (b1) represented by the following Formula (1) and another monomer (b2), wherein the polymer of the component (B) contains a graft copolymer of another monomer (b2) having the monomer unit derived from the macromonomer (b1) in the side chain,

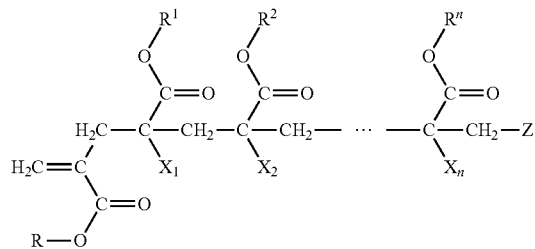

wherein:
R and $R^1$ to $R^n$ are each independently represent a hydrogen atom, an alkyl group which optionally have a substituent, a cycloalkyl group, an aryl group which optionally have a substituent, an aryl group which optionally have a substituent or a heterocyclic group which optionally have a substituent, provided that at least one of R and $R^1$ to $R^n$ is not a hydrogen atom;
$X_1$ to $X_n$ each independently represent a hydrogen atom or a methyl group;
Z represents a terminal group, and
n represents a natural number of from 3 to 10,000.

2. The resin composition according to claim 1, wherein the component (A) is a polymer containing a fluorine atom or a chlorine atom in the molecule.

3. The resin composition according to claim 2, wherein the polymer containing a fluorine atom in the molecule is at least one polymer selected from the group consisting of polyvinylidene fluoride, a polyvinylidene fluoride-hexafluoropropylene copolymer, an ethylene-chlorotrifluoroethylene copolymer, and polytetrafluoroethylene.

4. The resin composition according to claim 2, wherein the polymer containing a chlorine atom in the molecule is at least one polymer selected from the group consisting of polyvinyl chloride and chlorinated polyvinyl chloride.

5. The resin composition according to claim 1, wherein the component (A) is at least one polymer selected from the group consisting of a polyolefin, a polysulfone, polyether sulfone, cellulose, and any derivative thereof.

6. The resin composition according to claim 1, wherein a proportion of a monomer unit of the macromonomer (b1) with respect to a total mass of a monomer unit of the macromonomer (b1) and a monomer unit of another monomer (b2) in the component (B) is from 5 to 99% by mass.

7. The resin composition according to claim 1, wherein another monomer (b2) is at least one (meth)acrylic acid ester selected from the group consisting of (meth)acrylic acid ester, a (meth)acrylic acid ester having a polyethylene glycol unit in a side chain, and a (meth)acrylic acid ester having a hydroxyl group.

8. A membrane-forming stock solution comprising the resin composition according to claim 1 and a solvent capable of dissolving the component (A).

9. The membrane-forming stock solution according to claim 8, wherein a transmittance of visible light at a wavelength of 400 nm is 70% or more.

10. The resin composition according to claim 1, wherein the substituent is at least one group or atom selected from the group consisting of an alkyl group, an aryl group, a carboxyl group, an alkoxycarbonyl group represented by —COOR', a cyano group a hydroxyl group, an amino group, an amide group represented by —CONR'R", a halogen, an allyl group, an epoxy group, an alkoxy group represented by —OR', and a hydrophilic or ionic group, wherein R' and R" each independently represents an alkyl group, a cycloalkyl group, or an aryl group.

11. The resin composition according to claim 1, further comprising a component (C) which is a polymer containing a vinylpyrrolidone unit.

12. The resin composition according to claim 11, wherein a content of the component (C) with respect to 100 parts by mass of a total amount of the component (A), the component (B), and the component (C) is from 0.1 to 50 arts by mass.

13. The resin composition according to claim 1, the component (B) further contains a block copolymer containing the monomer unit derived from the macromonomer (b1) and the monomer unit derived from another monomer (b2).

14. A porous membrane comprising a component (A), and a component (B), wherein:
the component (A) is a membrane-forming polymer, and
the component (B) is a polymer containing a monomer unit derived from a (meth)acrylic acid ester macromonomer (b1) represented by the following Formula (1) and a monomer unit derived from another monomer (b2), wherein the polymer of the component (B) contains a graft copolymer of another monomer (b2) having the monomer unit derived from the macromonomer (b1) in the side chain,

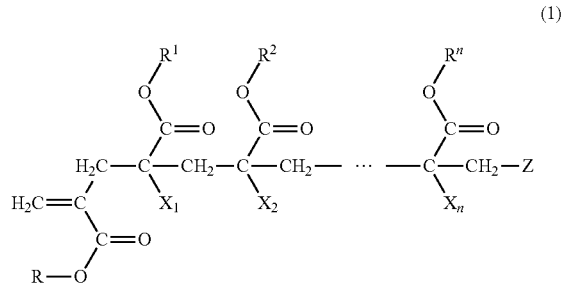

(1)

wherein:
R and $R^1$ to $R''$ are each independently a hydrogen atom, an alkyl group which optionally have a substituent, a cycloalkyl group which optionally have a substituent, an aryl group which optionally have a substituent, or a heterocyclic group which optionally have a substituent, provided that at least one of R and $R^1$ to $R''$ is not a hydrogen atom;
$X_1$ to $X_n$ are each independently a hydrogen atom or a methyl group;
Z is a terminal group; and
n is 3 to 10,000.

15. A hollow fiber membrane comprising the porous membrane according to claim 14.

16. An electrolyte support comprising the porous membrane according to claim 14 and an electrolyte.

17. A separator comprising the porous membrane according to claim 14.

18. A water treatment device comprising the porous membrane according to claim 14.

19. The porous membrane according to claim 14, wherein the component (A) is a polymer containing a fluorine atom or a chlorine atom in the molecule.

20. The porous membrane according to claim 19, wherein the polymer containing a fluorine atom is at least one polymer selected from the group consisting of polyvinylidene fluoride, a polyvinylidene fluoride-hexafluoropropylene copolymer, an ethylene-chlorotrifluoroethylene copolymer, and polytetrafluoroethylene.

21. The porous membrane according to claim 19, wherein the polymer containing a chlorine atom is at least one polymer selected from the group consisting of polyvinyl chloride and chlorinated polyvinyl chloride.

22. The porous membrane according to claim 14, wherein the component (A) is at least one polymer selected from the group consisting of a polyolefin, a polysulfone, a polyether sulfone, cellulose, and any derivative thereof.

23. The porous membrane according to claim 14, wherein a proportion of the monomer unit derived from the macromonomer (b1) with respect to a total mass of the monomer unit of the macromonomer (b1) and the monomer unit derived from another monomer (b2) in the component (B) is from 5% to 99% by mass.

24. The porous membrane according to claim 14, wherein another monomer (b2) is at least one (meth)acrylic acid ester selected from the group consisting of (meth)acrylic acid ester, a (meth)acrylic acid ester having a polyethylene glycol unit in a side chain, and a (meth)acrylic acid ester having a hydroxyl group.

25. The porous membrane according to claim 14, wherein the porous membrane is obtained by a method including a step of obtaining a porous membrane precursor using a membrane-forming stock solution, and a transmittance of visible light of the membrane-forming stock solution comprising a resin composition at a wavelength of 400 nm is 70% or more, wherein the resin composition comprising the component (A) and component (B).

26. The porous membrane according to claim 14, wherein the substituent is at least one group or atom selected from the group consisting of an alkyl group, an aryl group, a carboxyl group, an alkoxycarbonyl group represented by —COOR', a cyano group a hydroxyl group, an amino group, an amide group represented by —CONR'R", a halogen, an allyl group, an epoxy group, an alkoxy group represented by —OR', and a hydrophilic or ionic group, wherein R' and R" each independently represents an alkyl group, a cycloalkyl group, or an aryl group.

27. The porous membrane according to claim 14, further comprising a component (C) which is a polymer containing a vinylpyrrolidone unit.

28. The porous membrane according to claim 14, the component (B) further contains a block copolymer containing the monomer unit derived from the macromonomer (b1) and the monomer unit derived from another monomer (b2).

* * * * *